United States Patent
Sasagawa et al.

(10) Patent No.: US 10,702,991 B2
(45) Date of Patent: Jul. 7, 2020

(54) APPARATUS, ROBOT, METHOD AND RECORDING MEDIUM HAVING PROGRAM RECORDED THEREON

(71) Applicant: Panasonic Intellectual Property Management Co., Ltd., Osaka (JP)

(72) Inventors: Michiko Sasagawa, Osaka (JP); Ryouta Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 151 days.

(21) Appl. No.: 15/899,372

(22) Filed: Feb. 20, 2018

(65) Prior Publication Data

US 2018/0257236 A1 Sep. 13, 2018

(30) Foreign Application Priority Data

Mar. 8, 2017 (JP) ................................ 2017-044325

(51) Int. Cl.
   *B25J 11/00* (2006.01)
   *G06K 9/00* (2006.01)
   (Continued)

(52) U.S. Cl.
   CPC .......... *B25J 11/0015* (2013.01); *B25J 11/001* (2013.01); *G06K 9/00718* (2013.01);
   (Continued)

(58) Field of Classification Search
   CPC . B25J 11/0015; B25J 11/001; G06K 9/00718; G10L 15/08; G10L 25/63; G10L 2015/088; G10L 25/84; G06N 3/008
   (Continued)

(56) References Cited

U.S. PATENT DOCUMENTS

| 8,903,176 B2* | 12/2014 | Hill ........................ G06K 9/46 |
| | | 382/195 |
| 9,846,843 B2* | 12/2017 | Howard ................... G06N 5/04 |

(Continued)

FOREIGN PATENT DOCUMENTS

| JP | 2003-202892 | 7/2003 |
| JP | 2003202892 A * | 7/2003 |

(Continued)

OTHER PUBLICATIONS

Extended European Search Report dated Aug. 3, 2018 for the related European Patent Application No. 18158731.2.

(Continued)

*Primary Examiner* — Edwin S Leland, III

(74) *Attorney, Agent, or Firm* — Greenblum & Bernstein, P.L.C.

(57) ABSTRACT

An apparatus, robot, method and recording medium is provided, wherein when it is determined that a speech of an adult includes a warning word, whether the adult is angry or scolding is determined based on a physical feature value of the speech of the adult. When it is determined that the adult is angry, at least any of the following processes is performed: (a) a process of causing a loudspeaker to output a first sound, (b) a process of causing an apparatus to perform a first operation, and (c) a process of causing a display to perform a first display.

8 Claims, 13 Drawing Sheets

(51) Int. Cl.
*G10L 25/63* (2013.01)
*G10L 15/08* (2006.01)
*G06N 3/00* (2006.01)

(52) U.S. Cl.
CPC .............. *G06N 3/008* (2013.01); *G10L 15/08* (2013.01); *G10L 25/63* (2013.01); *G10L 2015/088* (2013.01)

(58) Field of Classification Search
USPC ......................................................... 704/251
See application file for complete search history.

(56) References Cited

U.S. PATENT DOCUMENTS

| | | | |
|---|---|---|---|
| 10,020,076 B1* | 7/2018 | Anumalasetty | G16H 50/20 |
| 2011/0118870 A1* | 5/2011 | Sugihara | G06N 3/008 |
| | | | 700/245 |
| 2013/0016815 A1* | 1/2013 | Odinak | G10L 15/30 |
| | | | 379/88.01 |
| 2014/0093849 A1* | 4/2014 | Ahn | G06N 3/008 |
| | | | 434/236 |
| 2014/0095151 A1* | 4/2014 | Sakamoto | G06F 40/151 |
| | | | 704/9 |
| 2015/0310878 A1* | 10/2015 | Bronakowski | G10L 25/63 |
| | | | 704/246 |
| 2016/0019915 A1* | 1/2016 | Khan | G10L 19/018 |
| | | | 704/239 |
| 2016/0372110 A1* | 12/2016 | Waltermann | G10L 15/22 |
| 2016/0379107 A1* | 12/2016 | Li | B25J 11/0005 |
| | | | 706/11 |
| 2017/0244942 A1* | 8/2017 | Ma | G06F 3/0304 |
| 2017/0310820 A1* | 10/2017 | Kao | G10L 25/21 |
| 2018/0166076 A1* | 6/2018 | Higuchi | B25J 13/003 |
| 2018/0240454 A1* | 8/2018 | Raj | G10L 25/27 |
| 2018/0257236 A1* | 9/2018 | Sasagawa | G06K 9/00718 |
| 2018/0285641 A1* | 10/2018 | Yan | G06K 9/00671 |
| 2018/0331839 A1* | 11/2018 | Gao | G06Q 10/107 |

FOREIGN PATENT DOCUMENTS

| | | | |
|---|---|---|---|
| JP | 2006-123136 | | 5/2006 |
| JP | 2006123136 A | * | 5/2006 |
| JP | 2009-131928 | | 6/2009 |
| JP | 2009131928 A | * | 6/2009 |

OTHER PUBLICATIONS

Breazeal C et al: "Recognition of affective communicative intent in robot-directed speech", Autonomous Robots, Kluwer Academic Publishers, Dordrecht, NL, vol. 12, No. 1, Jan. 1, 2002 (Jan. 1, 2002), pp. 83-104, XP002354166.

* cited by examiner

APPARATUS, ROBOT, METHOD AND RECORDING MEDIUM HAVING PROGRAM RECORDED THEREON

CROSS-REFERENCE TO RELATED APPLICATIONS

The present application claims priority under 35 U.S.C. § 119 of Japanese Application No. 2017-044325, filed on Mar. 8, 2017, the disclosure of which is expressly incorporated by reference herein in its entirety.

BACKGROUND

1. Technical Field

The present disclosure relates to a voice processing apparatus, robot, method, and recording medium having a program recorded thereon.

2. Description of the Related Art

In recent years, technologies for user emotion recognition by processing voice emitted from a user have been actively conducted. Examples of a conventional emotion recognition method include a method using language information about a voice emitted from a speaker, a method using prosodic characteristics of sound of the voice, and a method of performing a facial expression analysis from a face image.

Japanese Patent No. 4015424 discloses an example of technology of emotion recognition based on the language information about a voice emitted from a user. Specifically, Japanese Patent No. 4015424 discloses a technique as follows. When a user is asked a question, "Do you have fun in playing football?", and makes a reply, "Playing football is very boring", "football" is extracted as a keyword, and a phase including the keyword includes words indicating a negative feeling, "very boring". Thus, an inference is made that the user is not interested in football, and a question about topics other than football is made.

Also, Japanese Unexamined Patent Application Publication No. 2006-123136 discloses an example of technology of determining an emotion from inputted voice and face image of a user and outputting a response in accordance with the determined emotion. Specifically, Japanese Unexamined Patent Application Publication No. 2006-123136 discloses a technique of performing emotion recognition (anger, hate, fear, joy, sadness, surprise, and normal) from facial expressions using a facial action coding system (FACS) developed by Paul Ekman et al. and emotion recognition by voice (tension, joy, and bewilderment), weighting each emotion recognition result to calculate a tension evaluation value, determining the presence or absence of a tensional emotion based on the calculated tension evaluation value and, if an emotion of tension is present, causing a robot to perform a tension-mitigating action.

Furthermore, in robot control based on emotion recognition, it is often the case that a single user is assumed, and robot control assuming two or more users is less often assumed. Japanese Unexamined Patent Application Publication No. 2009-131928 discloses an example of related art assuming a plurality of users. In Japanese Unexamined Patent Application Publication No. 2009-131928, the action, state, and environment of a second user (for example, child) are measured and, based on the measurement result, presentation information to a first user (for example, father) is determined, and the determined presentation information is presented to the first user (for example, father) when getting home. Specifically, Japanese Unexamined Patent Application Publication No. 2009-131928 discloses a technique in which a robot lets the father know a desire from the child acquired through a conversation with the child when the father gets home, thereby making up communication deficiency between the child and the father.

When an adult warns a child, scolding the child is preferable instead of being angry at the child, in view of childhood education. However, in any of Japanese Patent No. 4015424 and Japanese Unexamined Patent Application Publication Nos. 2006-123136 and 2009-131928, distinguishing between "scolding" and "angry" is not in consideration at all in a scene where the adult warns the child. Thus, in the scene where the adult warns the child, there is no way of making the adult aware of being angry in the techniques disclosed in Japanese Patent No. 4015424 and Japanese Unexamined Patent Application Publication Nos. 2006-123136 and 2009-131928.

With the development of robot technology, robots have been remarkably widespread in recent years not only to commercial facilities but also to home. When a robot is introduced to home, a plurality of users can be present together such as parents and children, and various scenes of life can be assumed. Behaviors of the robot not suitable for these scenes of life may obstruct child rearing at times, making the robot difficult for use.

In particular, in a situation often observed at home with a small child in which an adult as a child caregiver warns the small child, a parent as a child caregiver seriously warns the child, and the robot should not behave selfishly. Thus, at home with the child, there is an opinion that the robot is desired to be stopped when the child is warned.

Meanwhile, it has been found that the highest concern of child caregivers regarding child rearing is scolding too much and shouting at loud.

In childhood education, "scolding" is recommended, and getting "angry" is an action adversely affecting personality development of children. "Scolding" a person is an action of warning with care for that person in a gentle and calm manner. Getting "angry" is an action of warning to calm down an emotion of anger or irritation of a speaker, and the emotion of the speaker appears therein.

However, in Japanese Patent No. 4015424 and Japanese Unexamined Patent Application Publication No. 2006-123136, various human emotions are merely determined, and distinguishing between "scolding" and getting "angry" is not performed. Thus, in a scene in which an adult warns a child, when the adult gets angry, the adult is disadvantageously not made aware of being angry. The technique disclosed in Japanese Unexamined Patent Application Publication No. 2009-131928 is for indirect communications among a plurality of users, and does not assume a scene in which an adult is angry at a child.

SUMMARY

In one general aspect, the techniques disclosed here feature an apparatus for processing voice, the apparatus including: a microphone which acquires a sound around the apparatus; a memory; a first determiner which extracts a voice from the acquired sound and determines whether the voice includes a speech of an adult; a voice recognizer which recognizes the speech of the adult when it is determined that the voice includes the speech of the adult and determines whether the speech of the adult includes a phrase included in a dictionary stored in the memory, the dictionary including a phrase which can be used when the adult warns a child; a second determiner which determines, when it is determined that the speech of the adult includes the phrase included in the dictionary, whether the adult is angry or scolding, based on a physical feature value of the speech of the adult; a controller which causes the apparatus to perform a first process when it is determined that the adult is angry; and any of a loudspeaker, a display, and a camera which acquires video data around the apparatus. When the apparatus includes the loudspeaker, the first process includes either of (i) a process of causing the loudspeaker to output a first sound and (ii) a process of causing the apparatus to perform a first operation. When the apparatus includes the display, the first process includes either of (i) a process of causing the display to perform a first display and (ii) a process of causing the apparatus to perform the first operation. When the apparatus includes the camera, the first process includes either of (i) a process of causing the camera to take an image of the adult and (ii) a process of causing the apparatus to perform the first operation.

According to the present disclosure, when an adult gets angry at a child, the adult can be notified of having got angry. As a result, an apparatus and so forth for performing a preferable process in view of childhood education can be provided.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
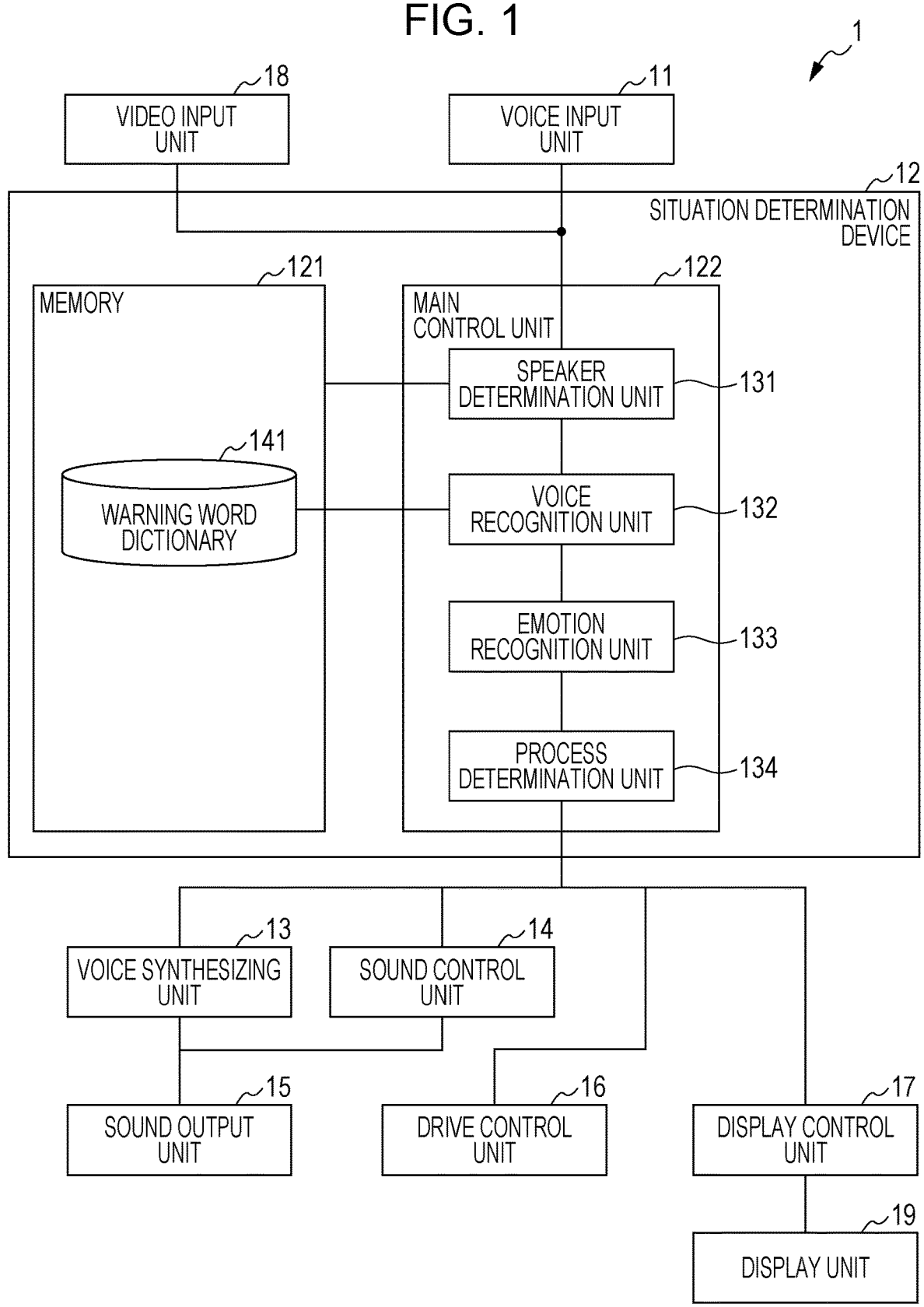
FIG. 1 is a diagram of an example of an entire structure of an apparatus in a first embodiment.

The present disclosure is to provide an apparatus and so forth capable of making an adult aware of being angry when the adult is angry at a child in a scene in which the adult warns the child.

An apparatus according to one aspect of the present disclosure is directed to an apparatus for processing voice, the apparatus including: a microphone which acquires a sound around the apparatus; a memory; a first determiner which extracts a voice from the acquired sound and determines whether the voice includes a speech of an adult; a voice recognizer which recognizes the speech of the adult when it is determined that the voice includes the speech of the adult and determines whether the speech of the adult includes a phrase included in a dictionary stored in the memory, the dictionary including a phrase which can be used when the adult warns a child; a second determiner which determines, when it is determined that the speech of the adult includes the phrase included in the dictionary, whether the adult is angry or scolding, based on a physical feature value of the speech of the adult; a controller which causes the apparatus to perform a first process when it is determined that the adult is angry; and any of a loudspeaker, a display, and a camera which acquires video data around the apparatus, in which when the apparatus includes the loudspeaker, the first process includes either of (i) a process of causing the loudspeaker to output a first sound and (ii) a process of causing the apparatus to perform a first operation, when the apparatus includes the display, the first process includes either of (i) a process of causing the display to perform a first display and (ii) a process of causing the apparatus to perform the first operation, and when the apparatus includes the camera, the first process includes either of (i) a process of causing the camera to take an image of the adult and (ii) a process of causing the apparatus to perform the first operation.

According to the present aspect, it is determined whether the sound acquired by the microphone includes a speech of an adult. When the sound includes a speech of an adult, it is determined whether the speech includes a phrase for use when the adult warns a child. When the speech includes the phrase, from the physical feature value of the speech of the adult, it is determined whether the adult is scolding or angry at a child. When it is determined that the adult is angry, the first process is performed on the apparatus, such as causing the first sound to be outputted, causing the apparatus to perform the first operation, causing the display to perform the first display, and causing the camera to take an image of the adult. This can make the adult aware of being angry.

In the above aspect, the first sound may include a predetermined alarm sound.

According to the present aspect, the adult can be made aware of being angry through the alarm sound.

In the above aspect, the first sound may include a voice notifying the adult that the adult is angry.

According to the present aspect, the adult can be made aware of being angry through the voice.

In the above aspect, the first sound may include a voice prompting the adult to release anger.

According to the present aspect, the output of the voice prompting the adult to release anger can mitigate anger of the adult.

In the above aspect, the first operation may include an operation of causing the display to be oriented toward the adult.

According to the present aspect, the apparatus operates so that the display is oriented toward the adult. Thus, consciousness of the adult can be oriented toward the apparatus, allowing the adult to be made aware of being angry.

In the above aspect, the first operation may include an operation of causing the apparatus to be oriented toward the adult.

According to the present aspect, the apparatus moves toward the adult. Thus, consciousness of the adult can be oriented toward the apparatus, allowing the adult to be made aware of being angry.

In the above aspect, the first operation may include an operation of causing the apparatus to laterally swing.

According to the present aspect, the lateral swing operation of the apparatus is performed. Thus, consciousness of the adult can be oriented toward the apparatus, allowing the adult to be made aware of being angry.

In the above aspect, the first display may include a display symbolically representing eyes and a mouth on the apparatus, and the display may correspond to a predetermined facial expression on the apparatus.

According to the present aspect, the predetermined facial expression using the eyes and the mouth is displayed on the display of the apparatus. Thus, consciousness of the adult can be oriented toward the facial expression, allowing the adult to be made aware of being angry and allowing anger of the adult to be mitigated.

In the above aspect, the predetermined facial expression may include any of an emotion of sadness, an emotion of surprise, an emotion of bewilderment, and an emotion of anger.

According to the present aspect, through the above facial expression, the adult can be made aware of being angry and anger of the adult can be mitigated.

In the above aspect, the second determiner may determine that the adult is angry when a physical feature value of the speech of the adult exceeds a threshold a plurality of times.

According to the present aspect, it is determined that the adult is angry when the physical feature value of the speech exceeds a threshold a plurality of times. Thus, it can be accurately detected that the adult is angry.

In the above aspect, the physical feature value may include any of a frequency of the voice, power of the voice, a speed of the speech, and a time of the speech.

According to the present aspect, whether the adult is angry is determined by using any of the frequency of the voice, the power of the voice, the speed of the speech, and the time of the speech. Thus, it can be accurately detected that the adult is angry.

In the above aspect, when the apparatus includes the camera, the second determiner may determine that the adult is scolding when determining that the adult has a facial expression other than angry and sadness, based on the video data in a first period after once determining that the adult is angry.

According to the present aspect, even if it is once determined that the adult is angry, if the video data acquired by the camera in the first period thereafter includes a facial expression of the adult other than angry and sadness, it is determined that the adult is scolding. Thus, it is possible to prevent the case in which it is determined that the adult is angry when the adult is scolding the child with in a harsh tone on purpose.

In the above aspect, the voice recognizer may further determine whether the speech of the adult includes a phrase corresponding to a name of the child, based on data indicating the name of the child stored in the memory, when it is determined that the speech of the adult includes a phrase corresponding to the name of the child, the second determiner may further determine that the child is a target person whom the adult is scolding or angry at, the apparatus may further include, when the apparatus includes the camera, a third determiner which determines whether a person included in the video data is the child, based on video data corresponding to the child stored in the memory, and a fourth determiner which determines, based on the video data, whether an orientation of the child has been changed in a second period after the speech of the adult is recognized when it is determined that the adult is scolding the child and the person included in the video data is the child and determines, based on the video data, whether the child is continuously holding an object by hand in the second period when it is determined that the orientation of the child has not been changed, in the second period, when it is determined that the orientation of the child has not been changed or when it is determined that the child is continuously holding the object by hand, the controller may cause the apparatus to perform a second process, when the apparatus includes the loudspeaker, the second process may include either of (i) a process of causing the loudspeaker to output a second sound and (ii) a process of causing the apparatus to perform a second operation, and when the apparatus includes the display, the second process may include either of (i) a process of causing the apparatus to perform the second operation and (ii) a process of causing the display to perform a second display.

According to the present aspect, when it is determined that the adult is angry, it is determined in the second period thereafter whether the orientation of the child has been changed and whether the child with the orientation of the child not changed is continuously holding the object by hand. This can determine whether the child is continuing the action for which the child is scolded. If the child is continuing the action for which the child is scolded, the second process is performed, such as causing the second sound to be outputted, causing the apparatus to perform the second operation, and causing the display to perform the second display. This can prompt the child continuing the action for which the child is scolded to stop the action.

In the above aspect, the second sound may include a predetermined alarm sound.

According to the present aspect, the child can be prompted through the alarm sound to stop the action for which the child is scolded.

In the above aspect, the second sound may include predetermined music.

According to the present aspect, the child can be prompted through the music to stop the action for which the child is scolded.

In the above aspect, the second sound may include a voice prompting the child to stop an action the child is currently doing.

According to the present aspect, a voice prompting the child to stop the action the child is currently doing is outputted. This can prompt the child to stop the action for which the child is scolded.

In the above aspect, the second sound may include a voice asking the child what the child is doing now.

According to the present aspect, the voice asking the child what the child is doing now is outputted. This can make the child aware that the action the child is currently doing is not a good action.

In the above aspect, the second operation may include an operation of causing the display to be oriented toward the child.

According to the present aspect, through the display of the apparatus oriented to the child, the child can be prompted to stop the action for which the child is scolded.

In the above aspect, the second operation may be an operation of causing the apparatus to be oriented toward the child.

According to the present aspect, through the apparatus moving so as to be oriented toward the child, the child can be prompted to stop the action for which the child is scolded.

In the above aspect, the second display may include a display symbolically representing eyes and a mouth on the apparatus, and the display may correspond to a predetermined facial expression on the apparatus.

According to the present aspect, the predetermined facial expression using the eyes and the mouth is displayed on the display of the apparatus. Through this display, the child can be prompted to stop the action for which the child is scolded.

A robot according to another aspect of the present disclosure includes the apparatus of any of the above features.

According to the present aspect, in a scene where the adult warns the child, a robot making the adult aware that the adult is angry when the adult is angry can be provided. As a result, a robot useful for childhood education can be provided.

A method according to still another aspect of the present disclosure is directed to a method of processing voice in an apparatus including a memory, a microphone, and any of a display, loudspeaker, and a camera, the method including: extracting a voice from a sound acquired by the microphone; determining whether the voice includes a speech of an adult; when determining that the voice includes the speech of the adult, recognizing the speech of the adult; determining whether the speech of the adult includes a phrase included in a dictionary stored in the memory, the dictionary including a phrase which can be used when the adult warns a child; when determining that the speech of the adult includes the phrase included in the dictionary, determining whether the adult is angry or scolding, based on a physical feature value of the speech of the adult; and when determining that the adult is angry, causing the apparatus to perform a first process, in which when the apparatus includes the loudspeaker, the first process may include either of (i) a process of causing the loudspeaker to output a first sound and (ii) a process of causing the apparatus to perform a first operation, when the apparatus includes the display, the first process may include either of (i) a process of causing the display to perform a first display and (ii) a process of causing the apparatus to perform the first operation, and when the apparatus includes the camera, the first process may include either of (i) a process of causing the camera to take an image of the adult and (ii) a process of causing the apparatus to perform the first operation.

A non-transitory recording medium according to yet another aspect of the above disclosure has recorded thereon a program for causing a computer to perform the method of the above.

An apparatus according to yet another aspect of the present disclosure is directed to an apparatus of processing voice, the apparatus including: a microphone which acquires a sound around the apparatus; a memory; a first determiner which extracts a voice from the acquired sound and determines whether the voice includes a speech of an adult; a voice recognizer which recognizes the speech of the adult when it is determined that the voice includes the speech of the adult and determines whether the speech of the adult includes, a plurality of times or more, a phrase included in a dictionary stored in the memory, the dictionary including a phrase which can be used when the adult warns a child; a second determiner which determines that the adult is angry when it is determined that the speech of the adult includes, the plurality of times or more, the phrase included in the dictionary and determines that the adult is scolding when it is determined that the speech of the adult does not include, the plurality of times or more, the phrase included in the dictionary; a controller which causes the apparatus to perform a first process when it is determined that the adult is angry; and any of a loudspeaker, a display, and a camera which acquires video data around the apparatus, in which when the apparatus includes the loudspeaker, the first process may include either of (i) a process of causing the loudspeaker to output a first sound and (ii) a process of causing the apparatus to perform a first operation, when the apparatus includes the display, the first process may include either of (i) a process of causing the display to perform a first display and (ii) a process of causing the apparatus to perform the first operation, and when the apparatus includes the camera, the first process may include either of (i) a process of causing the camera to take an image of the adult and (ii) a process of causing the apparatus to perform the first operation.

According to the present aspect, in a case where the adult warns the child, when the speech of the adult includes a phrase for use when the adult warns the child a predetermined number of times or more, it is determined that the adult is angry. Thus, it can be accurately detected that the adult is angry. Thus, it is possible to prevent the first process from being performed when the adult is scolding, and prevent the apparatus from performing an education-obstructing process. Furthermore, when the adult is angry, the first process is performed. Thus, through the first process, the adult can be made aware of being angry.

A robot according to yet another aspect of the present disclosure includes the apparatus of the above.

A method according to yet another aspect of the above disclosure is directed to a method of processing voice in an apparatus including a memory, a microphone, and any of a display, loudspeaker, and a camera, the method including: extracting a voice from a sound acquired by the microphone; determining whether the voice includes a speech of an adult; when determining that the voice includes the speech of the adult, recognizing the speech of the adult; determining whether the speech of the adult includes, a plurality of times or more, a phrase included in a dictionary stored in the memory, the dictionary including a phrase which can be used when the adult warns a child; when determining that the speech of the adult includes, the plurality of times or more, the phrase included in the dictionary, determining that the adult is angry; when determining that the speech of the adult does not include, the plurality of times or more, the phrase included in the dictionary, determining that the adult is scolding; and when determining that the adult is angry, causing the apparatus to perform a first process, in which when the apparatus includes the loudspeaker, the first process includes either of (i) a process of causing the loudspeaker to output a first sound and (ii) a process of causing the apparatus to perform a first operation, when the apparatus includes the display, the first process includes either of (i) a process of causing the display to perform a first display and (ii) a process of causing the apparatus to perform the first operation, and when the apparatus includes the camera, the first process includes either of (i) a process of causing the camera to take an image of the adult and (ii) a process of causing the apparatus to perform the first operation.

A non-transitory recording medium according to yet another aspect of the present disclosure has recorded thereon a program for causing a computer to perform the method of the above.

The program according to the present disclosure may be stored in a computer-readable recording medium.

EMBODIMENTS

In the following, each embodiment of the present disclosure is described with reference to the drawings. Note that the same reference numeral is used for the same component in each drawing.

First Embodiment

FIG. 1 is a diagram of an example of an entire structure of an apparatus 1 according to a first embodiment. The apparatus 1 may be configured of a robot or a system including a terminal such as a button-type portable terminal, smartphone, or tablet terminal. The apparatus 1 in FIG. 1 includes a voice input unit 11 (one example of a microphone), a situation determination device 12, a voice synthesizing unit 13 (one example of a controller), a sound control unit 14 (one example of the controller), a sound output unit 15 (one example of a loudspeaker), a drive control unit 16 (one example of the controller), a display control unit 17 (one example of the controller), a video input unit 18 (one example of a camera), and a display unit 19 (one example of a display).

If the apparatus 1 is configured of a robot, the voice input unit 11, the situation determination device 12, the voice synthesizing unit 13, the sound control unit 14, the sound output unit 15, the drive control unit 16, the display control unit 17, the video input unit 18, and the display unit 19 are incorporated in the robot, for example.

If the apparatus 1 is configured of a system including a terminal such as a smartphone, the voice input unit 11, the situation determination device 12, the voice synthesizing unit 13, the sound control unit 14, the sound output unit 15, the drive control unit 16, the display control unit 17, the video input unit 18, and the display unit 19 may be incorporated in the terminal, for example.

The voice input unit 11 is configured of, for example, a directional microphone to acquire a sound from a specific direction with higher sensitivity than that for sound from other directions, acquiring a sound around the apparatus 1 and outputting the sound to the situation determination device 12. The voice input unit 11 may be configured of a non-directional microphone in place of a directional microphone. The voice input unit 11 is, for example, incorporated in a main body unit of the apparatus 1 with the situation determination device 12 implemented thereon. Alternatively, the voice input unit 11 may be configured of, for example, an independent sound-collecting device such as a hand microphone, pin microphone, or desktop microphone. In this case, for example, the voice input unit 11 is connected to the main body unit of the apparatus 1 in a wired or wireless manner. Alternatively, the voice input unit 11 may be configured of a microphone of the terminal.

The voice synthesizing unit 13 converts text data of a response speech generated by a process determination unit 134, which will be described further below, into voice data by voice synthesizing process.

The sound output unit 15 is configured of, for example, a loudspeaker, outputting the voice data acquired by conversion by the voice synthesizing unit 13 to an outer space of the apparatus 1. The sound output unit 15 may be incorporated in the apparatus 1 or connected to the situation determination device 12 in a wired or wireless manner. Also, the sound output unit 15 may be configured of a loudspeaker of the terminal such as a smartphone.

The sound control unit 14 retains and manages sounds and music data. Also, the sound control unit 14 outputs a sound determined by the process determination unit 134, which will be described further below, to the sound output unit 15.

The drive control unit 16 drives and controls the main body unit of the apparatus 1 or robot having the situation determination device 12 implemented thereon. Specifically, the drive control unit 16 performs control of orienting a front portion of the apparatus 1 toward a user or controlling a drive wheel of the apparatus 1 or the like to bring the main body unit of the apparatus 1 closer to the user.

The display control unit 17 causes an image to be displayed on the display unit of the apparatus 1 or robot having the situation determination device 12 implemented thereon. Specifically, the display control unit 17 performs color setting and ON/OFF control on an LED panel configuring the display unit.

The video input unit 18 is configured of, for example, a distance image sensor such as a stereo camera or distance measurement sensor, acquiring image data around the apparatus 1 at a predetermined frame rate and outputting the image data to a main control unit 122. In this case, the image data is configured of distance image data with each pixel represented by an RGB color component and a depth. In place of the distance image sensor, the video input unit 18 may be configured of a normal image sensor not measuring a depth.

The display unit 19 is configured of, for example, an LED panel, liquid-crystal panel, or organic EL panel, displaying an image for making an adult aware of being angry under the control of the display control unit 17. The display unit 19 may be connected to the main body unit of the apparatus 1 in a wired or wireless manner.

The situation determination device 12 includes the main control unit 122 configured of a processor such as a CPU and a memory 121 configured of a non-volatile storage device. The main control unit 122 includes a speaker determination unit 131 (one example of a first determiner or extractor), a voice recognition unit 132, an emotion recognition unit 133 (one example of a second determiner or speech analyzer), and the process determination unit 134 (one example of the controller). The memory 121 stores a warning word dictionary 141. The speaker determination unit 131, the voice recognition unit 132, the emotion recognition unit 133, and the process determination unit 134 are implemented by, for example, executing a computer-readable program for the main control unit 122 to perform a situation determination process. This program is stored in the memory 121.

Also, all components configuring the situation determination device 12 may be implemented on the main body unit of the apparatus 1 or may be implemented on another apparatus (for example, a server) connected to the main body unit of the apparatus 1 via an optical fiber, a wireless manner, or any network such as a public telephone line. The situation determination device 12 may be implemented by the components partially implemented on the main body unit of the apparatus 1, the remaining components implemented on another apparatus, and the main body unit of the apparatus 1 and the other apparatus mutually communicating with each other.

The speaker determination unit 131 extracts voice from the sound acquired by the voice input unit 11, and determines whether an adult speech or child speech is included in the extracted voice. In detail, the speaker determination unit 131 extracts a voiceprint from the voice extracted from the sound acquired by the voice input unit 11 and compares the extracted voiceprint with an adult voiceprint stored in advance in the memory 121, thereby determining whether an adult speech or child speech is included. In this case, the memory 121 has stored in advance a voiceprint of an adult user owing the apparatus 1 and a child user's voiceprint. The speaker determination unit 131 calculates a similarity between the extracted voiceprint and the adult user's voiceprint stored in the memory 121 and, if the calculated similarity is equal to or larger than a threshold, determines that an adult speech is included. Meanwhile, the speaker determination unit 131 calculates a similarity between the extracted voiceprint and the child user's voiceprint stored in the memory 121 and, if the calculated similarity is equal to or larger than a threshold, determines that a child speech is included.

The speaker determination unit 131 may determine whether an adult speech or child speech is included by using another method. For example, the memory 121 stores in advance an adult acoustic model and a child acoustic model. The speaker determination unit 131 then performs, on the extracted voice, a voice recognition process using the adult acoustic model and a voice recognition process using the child acoustic model, and calculates a degree of reliability indicating a likelihood of each recognition result. When the reliability when the adult acoustic model is used is higher than the reliability when the child acoustic model is used, the speaker determination unit 131 determines that an adult speech is included. In place of the acoustic models, the speaker determination unit 131 may make this determination by using language models. In this case, the memory 121 stores in advance an adult language model and a child language model. When the reliability of the adult language model is higher than the reliability of the child language model with respect to the extracted voice, the speaker determination unit 131 determines that an adult speech is included.

The acoustic models retain waveform samples of phonemes, and the language models retain word information such as word sequences in a predetermined language.

Figure 2:
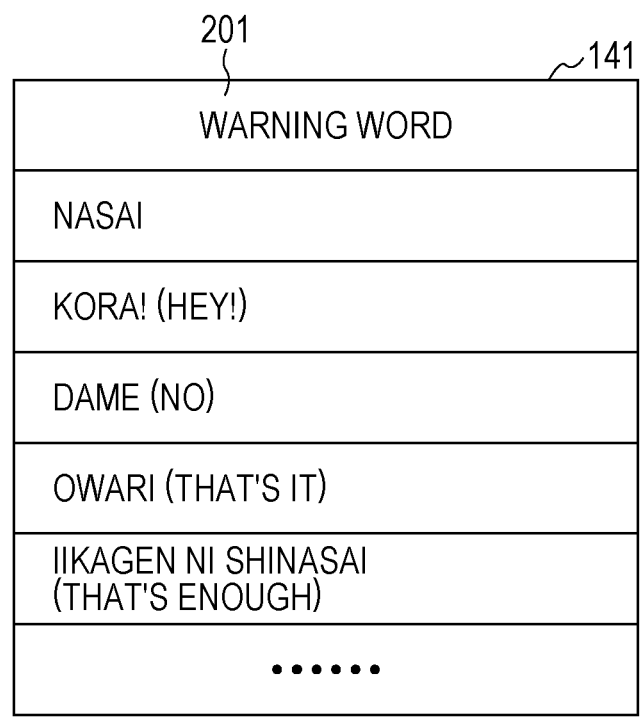
FIG. 2 is a diagram of one example of a warning word dictionary in the first embodiment.

The warning word dictionary 141 is a database in which warning words (phrases) to be used by an adult when warning a child are registered in advance. FIG. 2 is a diagram of one example of the warning word dictionary 141 in the first embodiment. The warning word dictionary 141 includes a warning word column 201. In the warning word column 201, one or more warning words to be used by an adult when warning a child are registered. In the example of FIG. 2, "Nasai" often for use when warning a child such as "Yamenasai (Stop it)" and "Hamigaki shinasai (Brush your teeth)" and "Kora! (Hey!)" as a call phrase are registered. Furthermore, in the example of FIG. 2, "Dame (No)", "Owari (That's it)", and "Iikagen ni shinasai (That's enough)" are registered. However, these warning words are merely examples, and warning words other than those exemplarily listed in FIG. 2 to be used by an adult when warning a child may be registered in the warning word dictionary 141.

While the warning word dictionary 141 is stored in advance in the memory 121 in the example of FIG. 1, the present disclosure is not limited to this. A mode may be adopted in which the warning word dictionary 141 is stored in another apparatus (for example, a server) connected to the apparatus 1 via a network. In this case, the warning word dictionary 141 is managed by an administrator (for example, a manufacturer or service provider of the apparatus 1) of the other apparatus in a unified manner, and is updated as occasion arises.

When the speaker determination unit 131 determines that an adult speech is included, the voice recognition unit 132 recognizes the adult speech by using, for example, the acoustic models and the language models, and generates text data indicating the recognized content. The voice recognition unit 132 determines whether the generated text data includes a warning word registered in the warning word dictionary 141.

However, the above is merely an example. When the speaker determination unit 131 determines that an adult speech is included, the voice recognition unit 132 may determine whether a phoneme sting recognized by using the acoustic models without using the language models includes a warning word registered in the warning word dictionary 141. Alternatively, when the speaker determination unit 131 determines that an adult speech is included, the voice recognition unit 132 may divide text data generated by applying morphological analysis on text data generated by using the acoustic models and the language models into a plurality of words, specify a word class of each of the words acquired by division, and compare the word included in the generated text data with the warning word dictionary 141 in consideration of the specified word class. For example, in addition to the warning word column 201, a word class column may be further included in the warning word dictionary 141. When the word and the word class included in the generated text data matches a warning word and its word class registered in the warning word dictionary 141, the voice recognition unit 132 determines that a warning word registered in the warning word dictionary 141 is included in the generated text data.

Also, the voice recognition unit 132 may check whether the name of a child as a warning-target person is included in the generated text data. The name and nickname of the user using the apparatus 1 may be set, for example, when the apparatus 1 is used for the first time, and may be stored in the memory 121 as user information. In this case, the name and nickname of the user may be stored in the memory 121 in association with information for distinguishing whether the user is an adult or child. The name and nickname may be set by having each user speak the name and nickname. In this case, the information for distinguishing whether the user is an adult or child may be acquired by voice recognition of the name and nickname spoken by the user or may be acquired by having the information for distinguishing whether the user is an adult or child spoken. Alternatively, when the apparatus 1 or the terminal connected to the apparatus 1 via the network includes an input unit which inputs text data, the name and nickname of the user and the information for distinguishing whether the user is an adult or child may be inputted through this input unit.

When the voice recognition unit 132 determines that a warning word is included in an adult speech, the emotion recognition unit 133 determines, based on a physical feature value of the adult speech, whether the adult is angry or scolding.

Here, the emotion recognition unit 133 determines that the adult is angry when the physical feature value of the adult speech is equal to or larger than a threshold indicating that the adult is angry, and determines that the adult is scolding when the physical feature value is smaller than the threshold.

For example, Japanese Unexamined Patent Application Publication No. 2005-283647 discloses a technique of determining that a speaker is angry when a likelihood between a time pattern of a prosodic feature value (fundamental frequency and sound pressure (voice power)) for each word of voice spoken by the speaker and a prosodic model for each word generated from a statistic of the time pattern of the prosodic feature value of voice spoken previously by the speaker exceeds a predetermined threshold.

Thus, the emotion recognition unit 133 can use this technique to determine whether the speaker is angry. In this case, the emotion recognition unit 133 performs a statistical process on the time pattern of the prosodic feature value for each word of each user using the apparatus 1 to generate a prosodic model for each word of each user in advance and store the prosodic model in the memory 121. The emotion recognition unit 133 then calculates a time pattern of a prosodic feature value of a word (for example, a warning word) included in voice including a warning word as a physical feature value, and when a likelihood between the calculated time pattern of the prosodic feature value and a prosodic model corresponding to this time pattern of the prosodic feature value is larger than a threshold, the emotion recognition unit 133 determines that the adult is angry. On the other hand, when the likelihood is equal to or smaller than the threshold, the emotion recognition unit 133 determines that the adult is scolding. In the present embodiment, in addition to the fundamental frequency and the sound pressure, the prosodic feature value may include a speech speed and a speech time.

Also, Japanese Patent No. 4914295 discloses a technique of determining, when periodic fluctuations of an amplitude envelope for one section in a voiced section of an input audio signal have a frequency of 10 Hz to a frequency smaller than 170 Hz, that voice occurred from a speaker in a strained state in that one section and determining an anger intensity from a strain occurrence index indicating a degree of strain ability at the time of speech for the input audio signal determined as an audio signal that occurred in the strained state.

Thus, the emotion recognition unit 133 may use this technique to determine whether the speaker is angry. In this case, the emotion recognition unit 133 calculates a strain occurrence index for voice including a warning word as a physical feature value and, when the strain occurrence index is larger than a threshold, determines that the adult is angry.

The above schemes are merely examples, and any scheme of estimating an angry emotion from voice including a warning word may be adopted.

Furthermore, the emotion recognition unit 133 may determine whether the adult is angry by using the following scheme. For example, the emotion recognition unit 133 may determine that the adult is angry when a period with the physical feature value of voice including a warning word larger than a threshold continues for a period equal to or more than a predetermined period. Alternatively, the emotion recognition unit 133 may determine that the adult is angry when an observation is made that the number of times when the physical feature value of voice including a warning word exceeds a threshold is equal to or more than a predetermined number of times within a predetermined period.

Here, whether the adult has an angry emotion is detected based on the physical feature value of voice including a warning word. Occasionally, an adult as a child caregiver may scold a child by making an angry face on purpose. In this case, it is assumed that the facial expression of the adult is changed from the angry face to a smiley face after speaking voice including a warning word. Thus, if detecting that the facial expression of the adult has been changed from an angry face to a smiley face within a predetermined period (one example of a first period) after determining that the adult is angry, the emotion recognition unit 133 may determine that the adult is not angry but scolding. In detail, when determining that the adult is angry, the emotion recognition unit 133 analyzes image data acquired by the video input unit 18 in a predetermined period before and after the time of that determination. When determining that the facial expression of the adult included in the analyzed image data has been changed from an angry face to a smiley face, the emotion recognition unit 133 determines that the adult is scolding. A feature value of the face of each user using the apparatus 1 is stored in advance in the memory 121 and, by using this feature value of the face, the emotion recognition unit 133 extracts image data of the face of the adult included in the image data. Then, by analyzing the facial expression from the extracted image data of the face of the adult, the emotion recognition unit 133 determines whether the face of the adult has been changed from an angry face to a smiley face. Alternatively, the emotion recognition unit 133 may adopt a method of extracting image data of the face from the feature of the face of each user and causing a server connected via a network to perform facial expression analysis, thereby determining whether the adult's face has been changed from an angry face to a smiley face.

Also, the emotion recognition unit 133 may determine that the adult is angry if the adult's speech includes a predetermined number of warning words registered in the warning word dictionary 141 or more, and may determine that the adult is scolding if the adult's speech does not include a predetermined number of warning words. Here, an appropriate value can be adopted as the predetermined number, such as one, two, or three.

The process determination unit 134 performs a first process for making the adult aware of being angry when the emotion recognition unit 133 determines that the adult is angry. As the first process, at least one or plurality of the following processes (a), (b), and (c) can be adopted.

Process (a)

The process (a) is a process of causing voice of a response sentence or a set sound to be outputted from the sound output unit 15. In the process (a), if a mother of a child is the angry adult, the process determination unit 134 generates a response sentence notifying the mother of being angry, "Mom, are you angry?", or a response sentence prompting the mother to release her anger, "Smile, Mom", and outputs the generated response sentence to the voice synthesizing unit 13. The outputted response sentence is converted by the voice synthesizing unit 13 into voice data, and is outputted from the sound output unit 15 to the outside of the apparatus 1. Here, by comparing the voiceprint of each user stored in advance in the memory 121 with a voiceprint of voice spoken by the adult, the process determination unit 134 determines a person who is angry, such as mother or father. If the father is the angry adult, "Mom" in the above response sentences is changed to "Daddy", "Dad", or the like. Also, "Mom" in the above response sentences may be changed to the name of the speaking adult.

Alternatively, in the process (a), the process determination unit 134 may output, to the sound control unit 14, a control command for outputting a set sound set in advance as a sound to be replayed when the adult is angry. In this case, the sound control unit 14 receiving the control command causes sound data of the set sound stored in advance to be outputted to the outside of the apparatus 1 via the sound output unit 15. As the set sound, for example, an alarm sound for notifying that the adult is angry or a melody sound for mitigating the anger may be adopted.

Process (b)

The process (b) is a process of causing an operation for notifying the adult of being angry to be performed by the apparatus 1. In the process (b), the process determination unit 134 outputs, to the drive control unit 16, a control command for causing the apparatus 1 to be turned so that the display unit 19 is toward the adult as a speaker. In this case, for example, the drive control unit 16 receiving the control command causes the apparatus 1 to be turned by a turning amount defined by the control command, thereby driving the apparatus 1 so that the display unit 19 is toward the adult as a speaker.

In detail, the process determination unit 134 first detects an orientation of the adult with respect to the apparatus 1. The orientation of the adult with respect to the apparatus 1 is defined by, for example, an angle formed by a straight line linking the center of the apparatus 1 and the position of the adult in a real space and a front direction of the apparatus 1. As the front direction of the apparatus 1, for example, the direction of the normal to a display surface of the display unit 19 can be adopted.

If the voice input unit 11 is configured of, for example, a directional microphone, the process determination unit 134 determines that an adult is present in a direction in which the directional microphone acquired voice from the center of the apparatus 1. Alternatively, if the voice input unit 11 is configured of a plurality of microphones (including a directional microphone or non-directional microphone), the process determination unit 134 determines that an adult is present in a direction of a microphone which acquired voice with the highest sound pressure, from among the plurality of microphones.

Alternatively, the process determination unit 134 may detect an orientation of an adult with respect to the apparatus 1 from the image data acquired by the video input unit 18. In this case, the process determination unit 134 may detect the position of the adult in a real space from the image data and, based on the detected position, determine an orientation of the adult with respect to the apparatus 1. For example, if the video input unit 18 is configured of a distance image sensor and a depth component is included in the image data, the process determination unit 134 extracts an adult region from the image data and detects the position of the adult in the real space from the coordinates and depths of a plurality of pixels configuring the extracted adult region. Also, if the video input unit 18 is configured of an image sensor which acquires image data not including a depth, the process determination unit 134 extracts an adult region from the image data and detects the position of the adult in the real space from the coordinates of a plurality of pixels configuring the extracted adult region and the size of the adult region.

The process determination unit 134 then outputs, to the drive control unit 16, a control command for determining an angle defining the orientation of the adult with respect to the apparatus 1 detected by any of the above schemes as a turning amount of the apparatus 1. The drive control unit 16 receiving this control command then drives the drive wheel of the apparatus 1 in accordance with the turning amount indicated by the control command to bring the display unit 19 toward the adult.

Still alternatively, in the process (b), the process determination unit 134 may output, to the drive control unit 16, a control command for bringing the apparatus 1 closer to the adult as a speaker to bring the apparatus 1 closer to the apparatus 1. In this case, the process determination unit 134 detects the position of the adult in the real space by any of the above schemes, turns the apparatus 1 so that the front of the display unit 19 is toward the direction of that position, and outputs, to the drive control unit 16, a control command for moving the apparatus 1 near that position.

Still alternatively, the process determination unit 134 may output a control command to the drive control unit 16 until the forward front of the display unit 19 is toward the position of the adult in the real space and a distance between the adult and the apparatus 1 becomes equal to or shorter than a predetermined distance, while monitoring the coordinates and depths of the adult region included in the image data acquired by the video input unit 18.

Still alternatively, in the process (b), the process determination unit 134 may output, to the drive control unit 16, a control command for swinging the apparatus 1 laterally. A robot 1001, which will be described in a third embodiment, includes therein a weighted pendulum capable of laterally swinging the barycenter position of the robot 1001. Thus, by performing control of laterally swinging this pendulum, the drive control unit 16 can laterally swing the robot 1001.

Process (c)

The process (c) is a process of causing a display for making an adult aware of being angry to be made on the display unit 19. Here, as the display, in a display symbolically representing the facial expression on the apparatus 1 including the eyes and the mouth, it is possible to adopt a display of causing the facial expression on the apparatus 1 to be made into a predetermined facial expression.

In the process (c), the process determination unit 134 outputs, to the display control unit 17, a control command for causing a predetermined image to be displayed on the display unit 19 for making the adult aware of being angry. The display control unit 17 receiving this control command reads predetermined image data from the memory and causes the image data to be displayed on the display unit 19.

Figure 13:
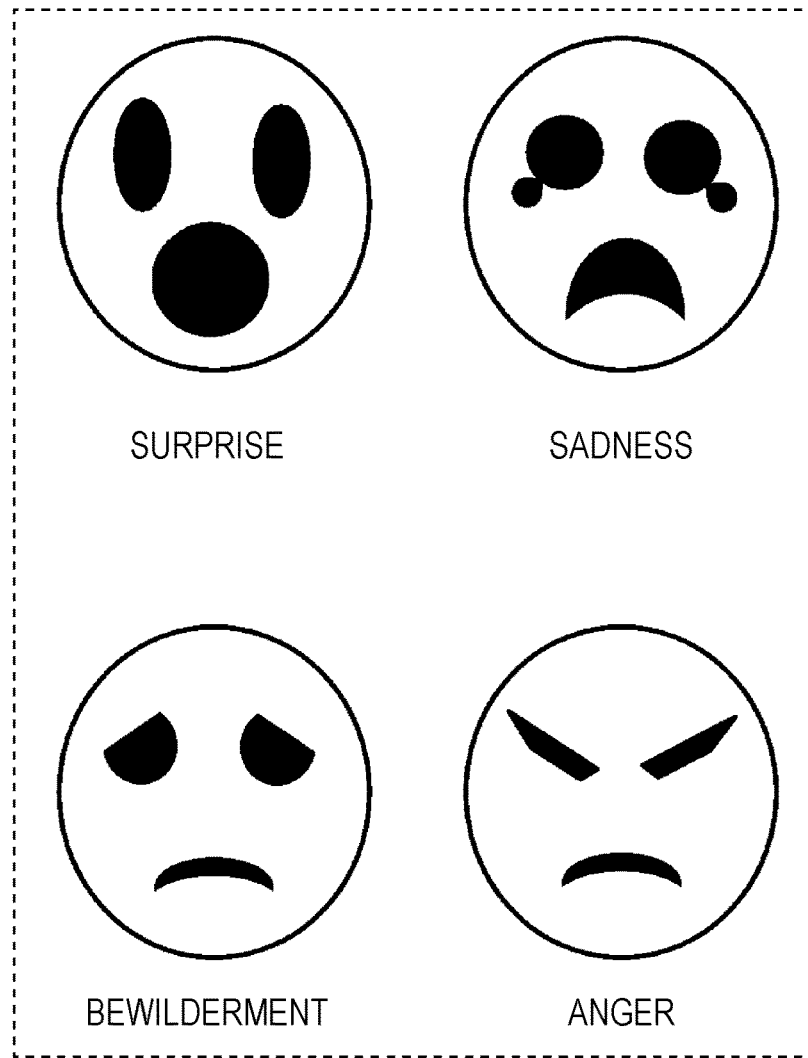
FIG. 13 is a diagram of display examples for making an adult aware of being angry.

FIG. 13 is a diagram of display examples for making an adult aware of being angry. In the examples of FIG. 13, four facial expressions using eyes and a mouth to represent human emotions are schematically depicted, such as a facial expression of surprise, a facial expression of sadness, a facial expression of bewilderment, and a facial expression of anger. The display control unit 17 causes image data of at least one of these images representing these facial expressions to be stored in advance in the memory. Upon receiving a control command from the process determination unit 134, the display control unit 17 then reads, from the memory, image data of any one of the facial expressions defined in advance from among these facial expressions and causes the read image data to be displayed on the display unit 19.

Alternatively, the display control unit 17 may cause the images representing these four facial expressions to be sequentially displayed on the display unit 19 in a predetermined sequence such as, for example, images representing facial expressions of surprise→sadness→bewilderment→anger. By displaying any one of the images of the facial expressions depicted in FIG. 13 to the adult, the adult can be made aware of being angry.

The process determination unit 134 may use two or more of the above processes (a) to (c) in combination.

Figure 3:
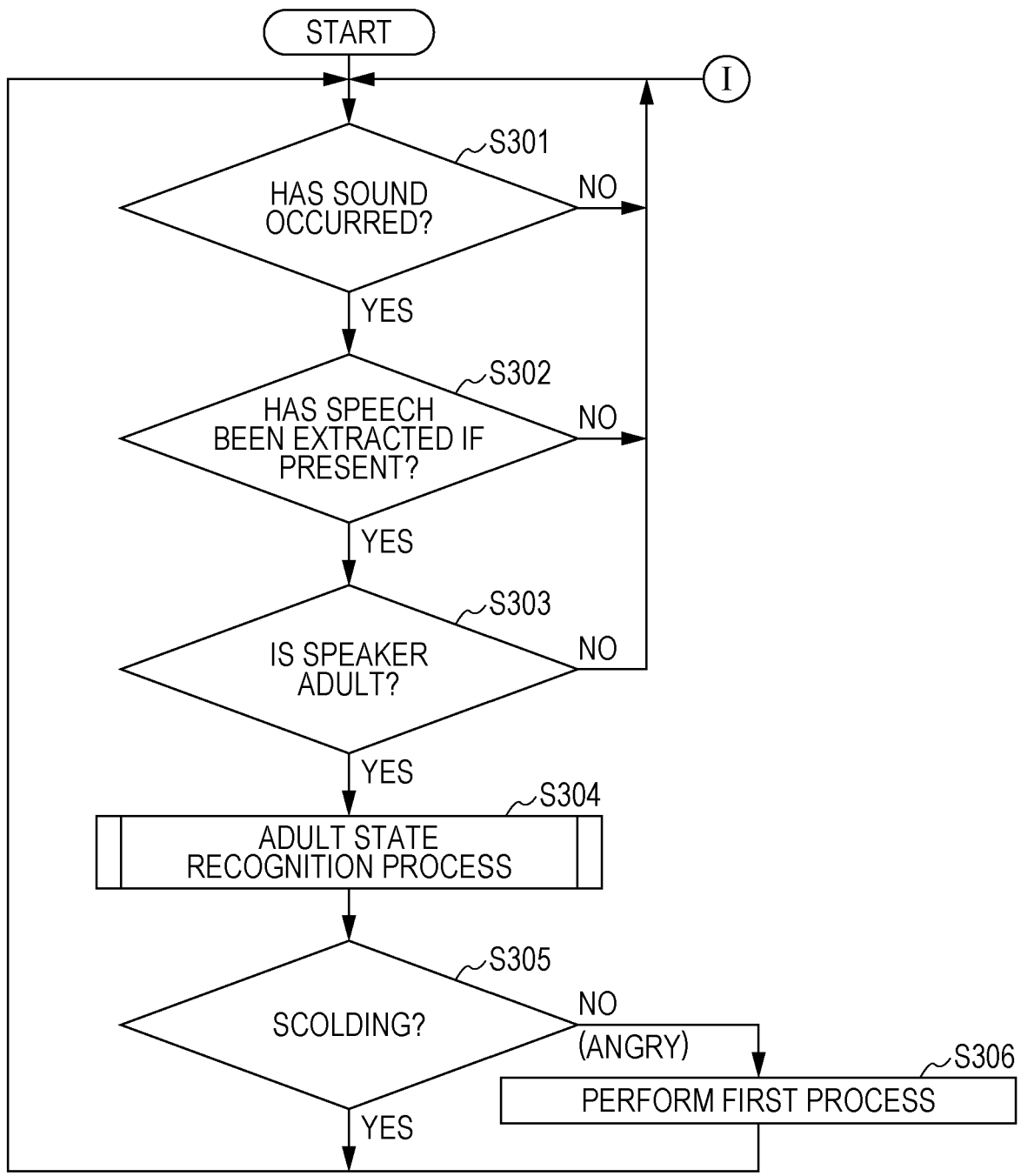
FIG. 3 is a flowchart of on example of a process by the apparatus according to the first embodiment.
Figure 4:
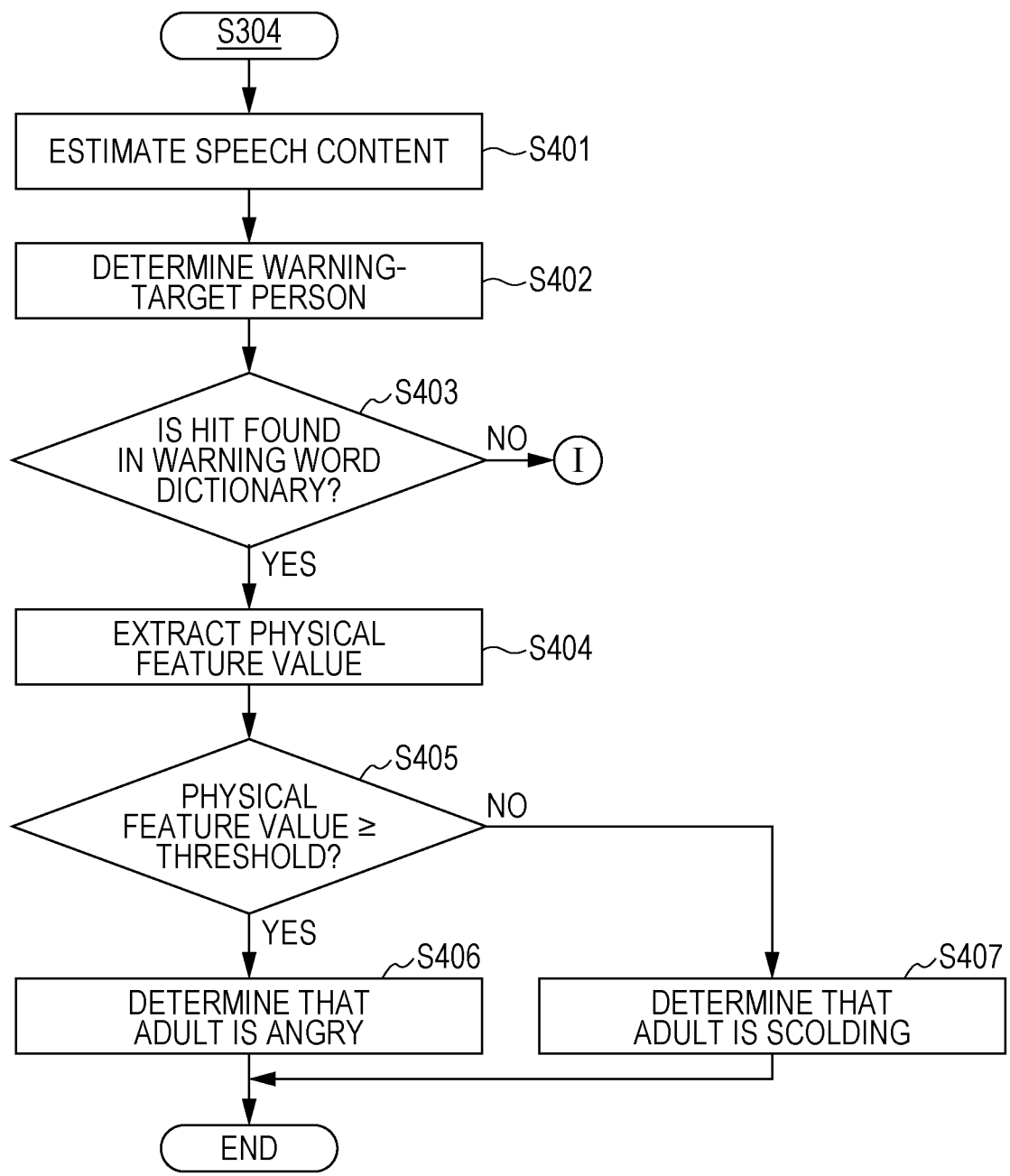
FIG. 4 is a flowchart of details of an adult state recognition process at S304 of FIG. 3.

FIG. 3 is a flowchart of on example of a process by the apparatus 1 according to the first embodiment. FIG. 4 is a flowchart of details of an adult state recognition process at S304 of FIG. 3. By using FIG. 3 and FIG. 4, a process of determining whether the adult as a child caregiver is scolding or angry at a child is described below.

First, if a sound has occurred around the apparatus 1 (YES at S301), the voice input unit 11 acquires a signal of that sound (audio signal). On the other hand, if no sound has occurred around the apparatus 1 (NO at S301), the process is returned to S301.

Next, the speaker determination unit 131 determines whether the acquired audio signal includes a speech and, when the audio signal includes a speech (YES at S302), the speaker determination unit 131 extracts an audio signal in a speech section. On the other hand, when the audio signal does not include a speech (NO at S302), the speaker determination unit 131 returns the process to S301 to wait for an input of an audio signal. Here, the speaker determination unit 131 determines that a speech is present when an audio signal at a predetermined level or higher is inputted.

Next, the speaker determination unit 131 determines whether the speaker is an adult or child from the audio signal of the extracted speech (S303). If the speaker is an adult (YES at S303), the process proceeds to S304. If the speaker is a child (NO at S303), the process is returned to S301. The speaker determination unit 131 determines whether the speaker is an adult by performing a process using a voice-print, a process using adult and child acoustic models, or the like.

Next, the voice recognition unit 132 and the emotion recognition unit 133 perform an adult state recognition process for determining whether the adult as a speaker is scolding or angry. Details of the adult state recognition process will be described further below by using FIG. 4. When it is determined by the adult state recognition process that the adult is scolding (YES at S305), the process is returned to S301, and the apparatus 1 becomes in a state of waiting for an input of an audio signal again. On the other hand, when it is determined by the adult state recognition process that the adult is angry (NO at S305), the process determination unit 134 performs the first process (one or plurality of processes from the above processes (a) to (c)) for making the adult as a speaker aware of being angry (S306). When the process at S306 ends, the process is returned to S301.

Specifically, any one or plurality of the following processes are performed: a response sentence speech process such as "Mom, are you angry?" or "Smile, Mom" as described above, replay of the set sound to be replayed when the adult is angry, drive control of orienting the display unit 19 toward the adult, drive control of brining the apparatus 1 closer to the adult, and a process of causing an image of a facial expression depicted in FIG. 13 to be displayed on the display unit 19. Here, once it is determined by the adult state recognition process that the adult is angry, the process determination unit 134 performs any one or plurality of the processes (a) to (c). This is merely an example. When anger is detected a plurality of times or is consecutively detected a plurality of times within a predetermined period, the process determination unit 134 may perform any one or plurality of the processes (a) to (c). Alternatively, when anger is detected a plurality of times within a predetermined period, the process determination unit 134 may change the process as the number of times increases. For example, the process determination unit 134 may perform any one of the processes (a) to (c) for anger detected at the first time, may additionally perform another process other than the process performed at the first time from among the processes (a) to (c) for anger detected at the second time, and may additionally perform another process other than the process performed at the second time for anger detected at the third time.

Next, details of the adult state recognition process are described by using FIG. 4. The voice recognition unit 132 acquires an audio signal spoken by the adult from the speaker determination unit 131, performs a voice recognition process on the acquired audio signal using the acoustic model and the language model for the adult, estimates a speech content (S401), and generates text data indicating the estimated speech content.

Next, the voice recognition unit 132 determines a warning-target person from the estimated speech content (S402). Here, the voice recognition unit 132 compares the estimated speech content with the name and nickname of the child stored in advance in the memory 121 to determine a warning-target person. For example, if the speech content is "Stop it, Ai-chan" and "Ai-chan" is stored in advance in the memory 121 as the nickname of the child, the speech content includes "Ai-chan" and thus the voice recognition unit 132 determines "Ai-chan" as a warning-target person (S402).

If the speech content does not include the name or nickname of the child, the voice recognition unit 132 may determine as no target person and cause the process to proceed. Also, a method may be adopted as follows. In the method, even if the current speech content does not include a target person, if the speech content includes a warning word and the nickname of the child in speeches a predetermined number of times or before a predetermined time, that person is determined as a target person.

Next, the voice recognition unit 132 determines whether the estimated speech content includes a warning word registered in the warning word dictionary 141 (S403). When the estimated speech content does not include a warning word registered in the warning word dictionary 141 (NO at S403), the process returns to S301 of FIG. 3 and the apparatus 1 becomes in a state of waiting for an input of an audio signal again. On the other hand, when the estimated speech content includes a warning word registered in the warning word dictionary 141 (YES at S403), the emotion recognition unit 133 calculates a physical feature value of that speech from the audio signal of the estimated speech content (S404). Here, as the physical feature value, for example, the time pattern of the prosodic feature value or the strain occurrence index described above is adopted.

Next, the emotion recognition unit 133 determines whether the calculated physical feature value is equal to or larger than a threshold (S405). When the calculated physical feature value is equal to or larger than the threshold (YES at S405), the emotion recognition unit 133 determines that the adult as a speaker is angry (S406). On the other hand, when the calculated physical feature value is smaller than the threshold (NO at S405), the emotion recognition unit 133 determines that the adult as a speaker is scolding (S407).

As described above, according to the apparatus 1 of the first embodiment, when the sound acquired by the voice input unit 11 includes an adult's speech, it is determined whether a warning word for use when the adult warns the child is included in that speech. Then, when that warning word is included in the speech, it is determined, from the physical feature value of the adult's speech, whether the adult is scolding the child or is angry. When it is determined that the adult is angry, any one or plurality of the processes (a) to (c) are performed. This allows the adult to be made aware of being angry.

Second Embodiment

Figure 5:
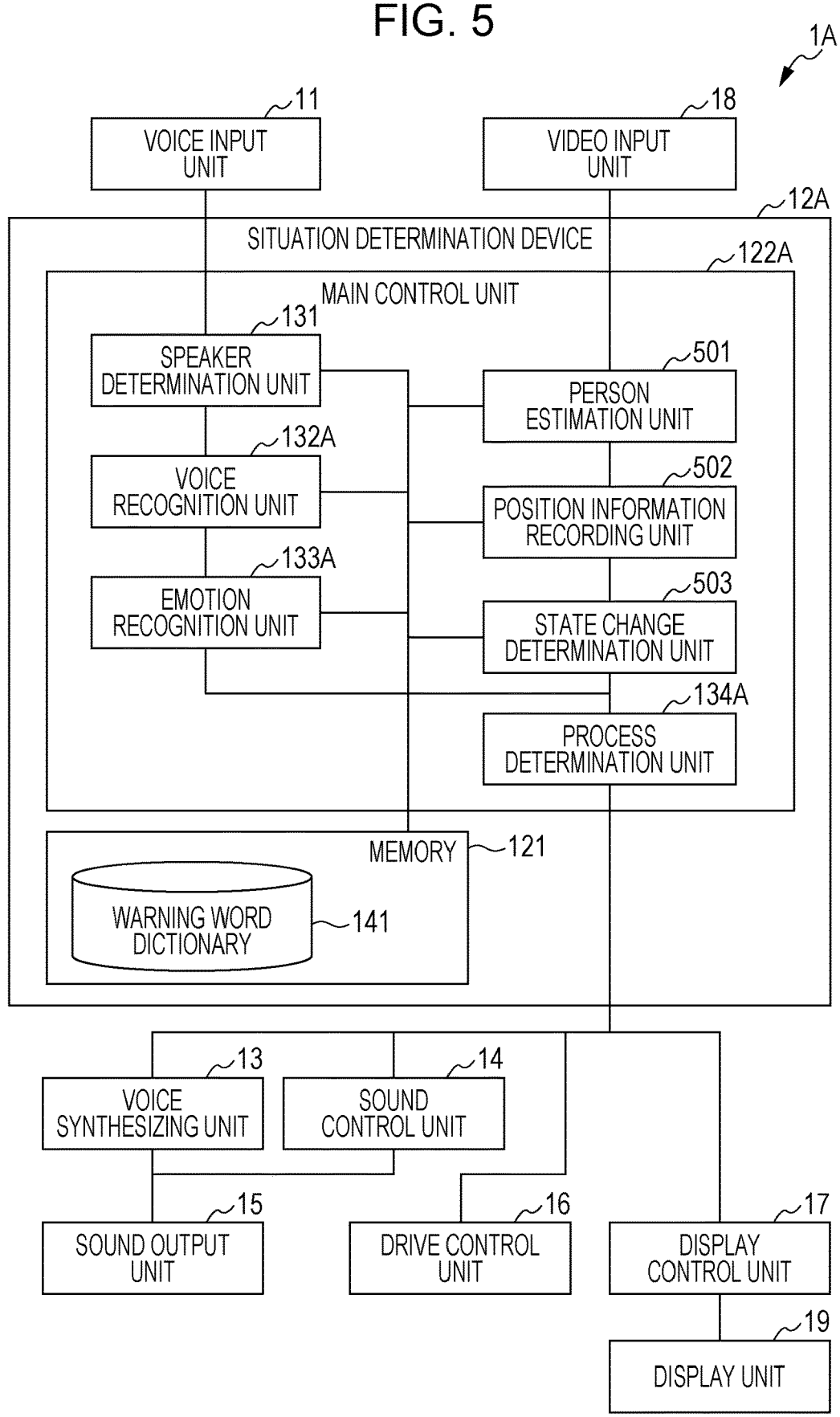
FIG. 5 is a diagram of one example of an entire structure of an apparatus in a second embodiment.

In a second embodiment, the image data acquired by the video input unit 18 is used to determine, in more detail, a situation when an adult as a child caregiver warns a child. FIG. 5 is a diagram of one example of an entire structure of an apparatus 1A in the second embodiment. In the following description, the same structure as that of the first embodiment is provided with the same reference numeral and is not described herein.

In the apparatus 1A, a structure with the same name as that in the apparatus 1 but with a newly added feature is depicted with a suffix of A provided at the tail. A situation determination device 12A includes a main control unit 122A. The main control unit 122A further includes a person estimation unit 501 (one example of a third determiner or comparator), a position information recording unit 502 (one example of a fourth determiner or video analyzer), and a state change determination unit 503 (one example of the fourth determiner or video analyzer).

A voice recognition unit 132A recognizes an adult as a speaker and a warning target person. Here, when the speaker determination unit 131 determines that an adult's speech is included, the voice recognition unit 132A extracts a voiceprint from the audio signal of the speech, matches the extracted voiceprint with the adult's voiceprint registered in advance in the memory 121 to recognize an adult as a speaker, and generates speaker information for identifying the speaker. Also, when the speaker determination unit 131 determines that an adult's speech is included, if the speech content includes the name or nickname of a child registered in advance in the memory 121, the voice recognition unit 132A recognizes that child as a warning-target person, and generates warning-target person information for identifying the recognized warning-target person.

The person estimation unit 501 estimates a user included in the image data acquired by the video input unit 18. Here, the person estimation unit 501 extracts the feature value of the face of the user included in the image data and compares the extracted feature value of the face with the feature value of the face for each user stored in advance in the memory 121 by using a related scheme, for example, pattern matching, thereby estimating a user included in the image data.

The person estimation unit 501 acquires either one or both of the warning-target person information and the speaker information generated by the voice recognition unit 132A and determines whether the user estimated from the image data matches, as a user, the warning-target person indicated by the acquired warning-target person information or the speaker indicted by the acquired speaker information. When the image data acquired by the video input unit 18 includes a plurality of users, the person estimation unit 501 determines whether each of the plurality of users estimated from the image data matches the warning-target person indicated by the warning-target person information or the speaker indicated by the speaker information.

Also, once estimating a warning-target person from the image data, the person estimation unit 501 then extracts a region indicating the warning-target person from the image data and depth information acquired by the video input unit 18 at a predetermined frame rate to generate coordinate information indicating coordinates of the warning-target person in the image data, and outputs the generated coordinate information and the corresponding image data together to the position information recording unit 502.

Furthermore, once estimating a speaker, the person estimation unit 501 extracts a region of the face of the speaker from the image data acquired by the video input unit 18 to generate coordinate information indicating coordinates of the face of the speaker in the image data, and outputs the generated coordinate information and the corresponding image data together to an emotion recognition unit 133A.

The position information recording unit 502 uses the coordinate information of the warning-target person outputted from the person estimation unit 501 to extract a region of the warning-target person from image data corresponding to that coordinate information, and detects a barycenter position of the warning-target person in the real space in the extracted region and records the barycenter position in the memory 121.

Also, the position information recording unit 502 detects a position of at least one hand of the warning-target person from the image data acquired by the video input unit 18, and records the detected position in the memory 121. Also, the position information recording unit 502 detects, in the image data acquired by the video input unit 18, for example, an object in the shortest distance with respect to the detected position of the hand or an object moving with the hand as an object which can be possibly held by the warning-target person, and records a position and a feature value (for example, contour data) of the detected object in the real space in the memory 121.

The position information recording unit 502 may detect the position of the hand of the warning-target person by using a hand template image or hand color information set in advance, or may detect the position of the hand of the warning-target person by using another related art image recognition technique.

The state change determination unit 503 determines whether the orientation of the warning-target person has been changed from the barycenter position of the warning-target person recorded on the memory 121.

Figure 6:
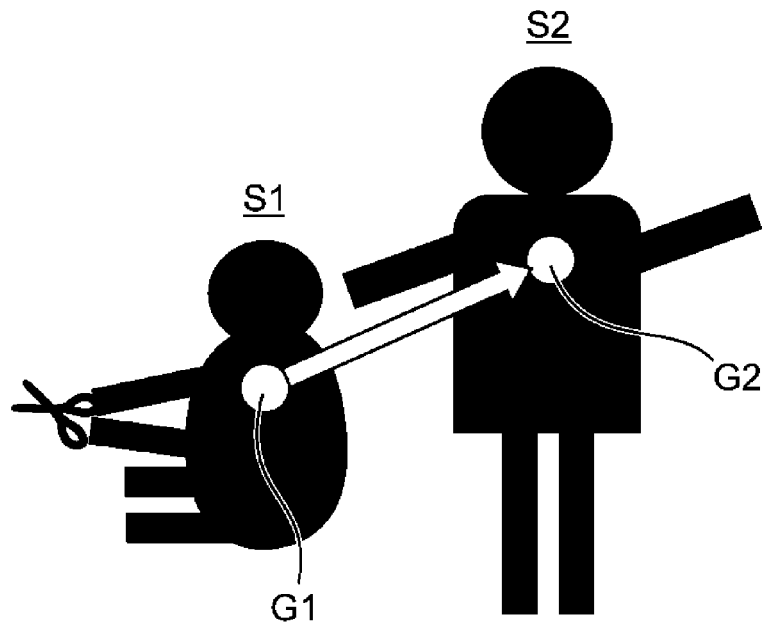
FIG. 6 is a diagram depicting a state in which a barycenter position of a warning-target person is changed.

FIG. 6 is a diagram depicting a state in which the barycenter position of the warning-target person is changed. In FIG. 6, a state S1 indicates a state in which the warning-target person is sitting down, and a state S2 in FIG. 6 indicates a state in which the warning-target person is standing.

G1 and G2 denote barycenter positions of a person in the state S1 and the state S2 of FIG. 6, respectively. For example, when a distance between the barycenter position G1 in the state S1 recorded on the memory 121 and the barycenter position G2 in the state S2 recorded on the memory 121 is equal to or more than a reference distance set in advance, the state change determination unit 503 determines that the orientation of the warning-target person has been changed.

Also, the state change determination unit 503 compares the position of the object recorded on the memory 121 with the position of the hand of the warning-target person, and determines that the warning-target person is holding the object while the object is continuously present in a predetermined range with respect to the position of the hand. Thereafter, the barycenter position of the warning-target person, the position of the hand of the warning-target person, the position of the object, and the feature value of the object are collectively referred to as action data.

Figure 7:
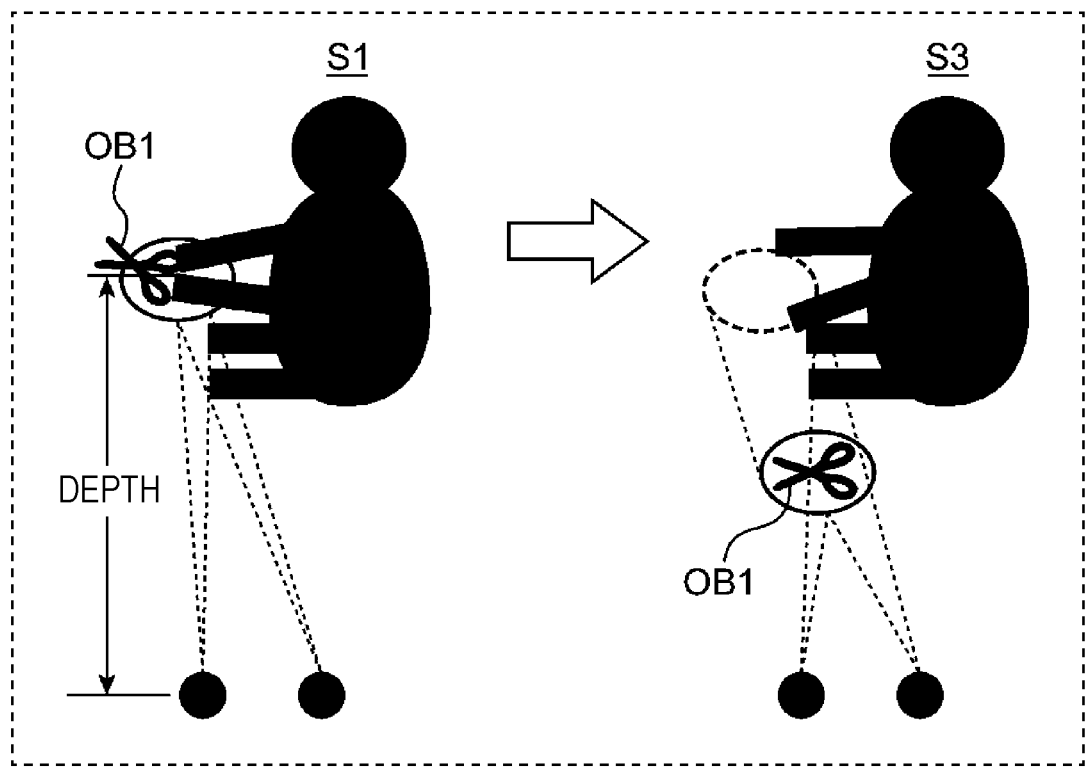
FIG. 7 is a diagram depicting a state in which an object held by the warning-target person is released.

FIG. 7 is a diagram depicting a state in which an object OB1 held by the warning-target person is released. In FIG. 7, a state S1 indicates a state in which the warning-target person is holding scissors as the object OB1 by hand as being sitting. A state S3 of FIG. 7 indicates a state in which the warning-target person puts the scissors on the floor as being sitting. In the state S1, the object OB1 is positioned in a predetermined range with respect to the hand, and the state change determination unit 503 thus determines that the warning-target person is holding the object OB1. On the other hand, in the state S3, the object OB1 is not positioned in the predetermined range with respect to the hand, and the state change determination unit 503 thus determines that the warning-target person is not holding the object OB1.

In the present embodiment, with reference to the timing when the warning-target person is warned, depending on whether the orientation of the warning-target person has been changed or whether the warning-target person has released the object, a determination can be made as to whether the action of the warning-target person has been changed. Thus, the present embodiment may adopt a mode of tracking action data from the timing when the warning-target person is warned or a mode of comparing action data at the timing when the warning-target person is warned with action data after a lapse of a predetermined time.

When the tracking mode is adopted, the motion of the warning-target person (for example, a running-around action or jumping action on the floor) can be found from a locus of the barycenter position of the warning-target person for a predetermined period from the timing when the warning-target person is warned. Thus, when the tracking mode is adopted, the state change determination unit 503 detects a motion of the warning-target person from a plurality of pieces of image data acquired in a predetermined period and, if there is a change between the motion detected in the first predetermined period and a motion detected in the latest predetermined period, the state change determination unit 503 can determine that the action of the warning-target person has been changed. With this, when the child is warned because of a running-around action or jumping action on the floor, whether the child has stopped the action for which the child is scolded can be determined. However, the computational complexity is increased in this tracking mode, and thus the latter mode is preferably adopted in view of reduction in computational complexity.

Upon receiving the coordinate information of the speaker and image data including the face of the speaker from the person estimation unit 501, the emotion recognition unit 133A extracts a face image from the received image data by using the coordinate information, and estimates an emotion of anger of the speaker from the extracted face image. Here, the emotion recognition unit 133A estimates an emotion of anger by using, for example, the technique described in Japanese Unexamined Patent Application Publication No. 2006-123136. In detail, the emotion recognition unit 133A calculates, from the image data, the emotion recognition result data indicating a probability of an emotion of anger. The emotion recognition unit 133A multiplies the physical feature value of the speech of the adult described in the first embodiment by a weighting factor α, multiples the emotion recognition result data by a weighting factor β, and then adds both of the multiplication result together to calculate an average weighted value therebetween. When the calculated average weighted value is equal to or larger than a threshold, it is determined that the speaker is angry.

Figure 15:
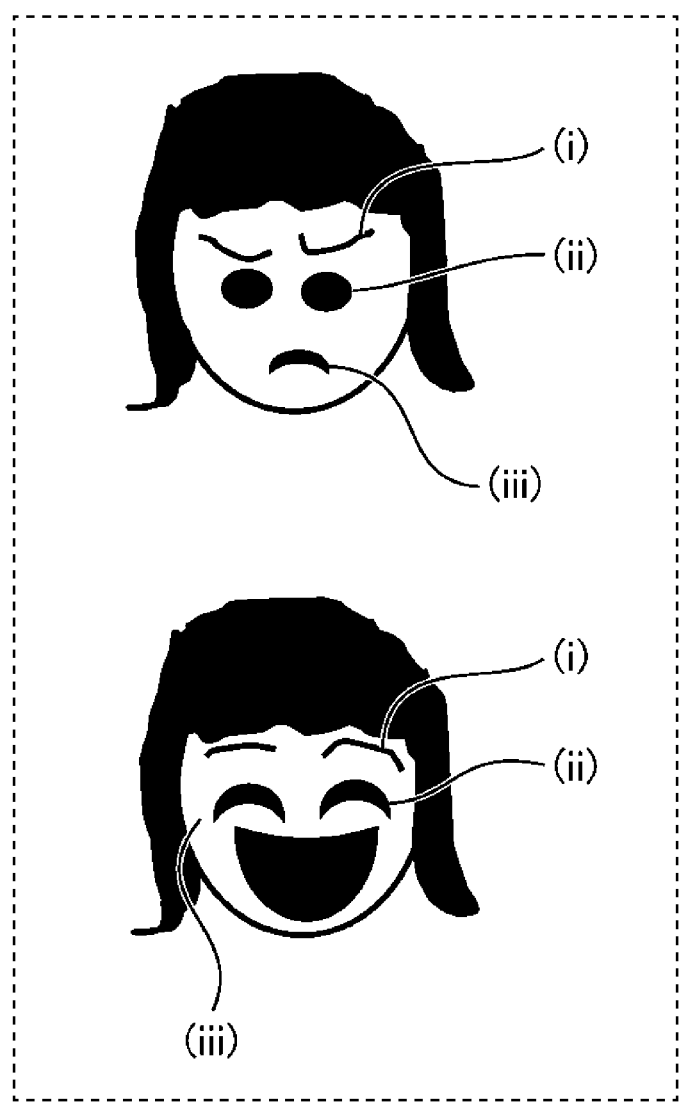
FIG. 15 is a diagram of examples of a facial expression of anger and a facial expression of joy.

FIG. 15 is a diagram of examples of a facial expression of anger and a facial expression of joy. In FIG. 15, an upper part depicts a facial expression of anger, and a lower part depicts a facial expression of joy. In the facial expression of anger, features appear such that (i) the eyebrows go down with their ends on a nose side going toward the center, (ii) the eyes become in a state of scowling, and (iii) the lip becomes in a state of being bitten. On the other hand, in the facial expression of joy, features appear such that (i) wrinkles appear at the tails of the eyes, (ii) the cheeks are pushed up, and (iii) the muscle around the eyes move. Thus, an emotion of anger can be estimated from the facial expression.

When the emotion recognition unit 133A determines that the adult as a speaker is scolding and the state change determination unit 503 determines that the orientation of the warning-target person has not been changed or the warning-target person is holding the object by hand, a process determination unit 134A performs a second process for stopping an action for which the warning-target person is scolded. As the second process, at least one or plurality of the following processes (d), (e), and (f) can be adopted.

Process (d)

The process (d) is a process of causing a voice of a response sentence or a set sound to be outputted from the sound output unit 15 for stopping the action for which the child is scolded. In the process (d), the process determination unit 134A generates a response sentence for stopping the action for which the child is scolded, and outputs the generated response sentence to the voice synthesizing unit 13. As the response sentence, a response sentence for asking the child what the child is doing now, "What are you doing?", can be adopted. Alternatively, as the response sentence, a response sentence prompting the child to stop the action being currently performed, "Why don't you stop it after once more?" or a response sentence, "The rest will be next time", can be adopted. The outputted response sentence is converted by the voice synthesizing unit 13 into voice data, and is outputted from the sound output unit 15 to the outside of the apparatus 1A.

Alternatively, in the process (d), the process determination unit 134A may output, to the sound control unit 14, a control command for outputting a set sound set in advance such as an end prompting sound (alarm sound) or music (for example, Auld Lang Syne or tidy-up music). In this case, the sound control unit 14 receiving the control command causes sound data of the set sound stored in advance to be outputted to the outside of the apparatus 1A via the sound output unit 15.

Process (e)

The process (e) is a process of causing an operation for stopping the action for which the child is scolded to be performed by the apparatus 1A. In the process (e), the process determination unit 134A outputs, to the drive control unit 16, a control command for causing the apparatus 1A to be turned so that the display unit 19 is toward the child as a warning-target person. In this case, for example, the drive control unit 16 receiving the control command causes the apparatus 1A to be turned by a turning amount defined by the control command, thereby driving the apparatus 1A so that the display unit 19 is oriented toward the child as a warning-target person.

In detail, the process determination unit 134A first detects an orientation of the child with respect to the apparatus 1A. The orientation of the child with respect to the apparatus 1A is defined by, for example, an angle formed by a straight line linking the center of the apparatus 1A and the position of the child in a real space and a front direction of the apparatus 1A. As the front direction of the apparatus 1A, for example, the direction of the normal to the display surface of the display unit 19 can be adopted.

In this case, the process determination unit 134A detects a position of the child in the real space from the image data and, based on the detected position, determines the orientation of the child with respect to the apparatus 1A. For example, the process determination unit 134A extracts a child region from the image data and detects the position of the child in the real space from the coordinates and depths of a plurality of pixels configuring the extracted child region.

The process determination unit 134A then outputs, to the drive control unit 16, a control command for determining an angle defining the orientation of the child with respect to the apparatus 1A detected by the above scheme as a turning amount of the apparatus 1A. The drive control unit 16 receiving this control command then drives the drive wheel of the apparatus 1A in accordance with the turning amount indicated by the control command to bring the display unit 19 toward the child.

Alternatively, in the process (e), the process determination unit 134A may output, to the drive control unit 16, a control command for bringing the apparatus 1A closer to the child as a warning-target person to bring the apparatus 1A closer to the child. In this case, the process determination unit 134A detects the position of the child in the real space by the above method, turns the apparatus 1A so that the front of the display unit 19 is toward the direction of that position, and outputs, to the drive control unit 16, a control command for moving the apparatus 1A near that position.

Still alternatively, the process determination unit 134A may output a control command to the drive control unit 16 until the forward front of the display unit 19 is toward the position of the child in the real space and a distance between the child and the apparatus 1A becomes equal to or shorter than a predetermined distance, while monitoring the coordinates and depth components of the child region included in the image data acquired by the video input unit 18.

Process (f)

The process (f) is a process of causing a display for stopping an action for which the child is scolded to be made on the display unit 19. Here, as the display, in a display symbolically representing the facial expression on the apparatus 1A including the eyes and the mouth, it is possible to adopt a display of causing the facial expression on the apparatus 1A to be made into a predetermined facial expression.

In the process (f), the process determination unit 134A outputs, to the display control unit 17, a control command for causing a predetermined image to be displayed on the display unit 19 for stopping an action for which the child is scolded. The display control unit 17 receiving this control command reads predetermined image data from the memory and causes the image data to be displayed on the display unit 19.

Figure 14:
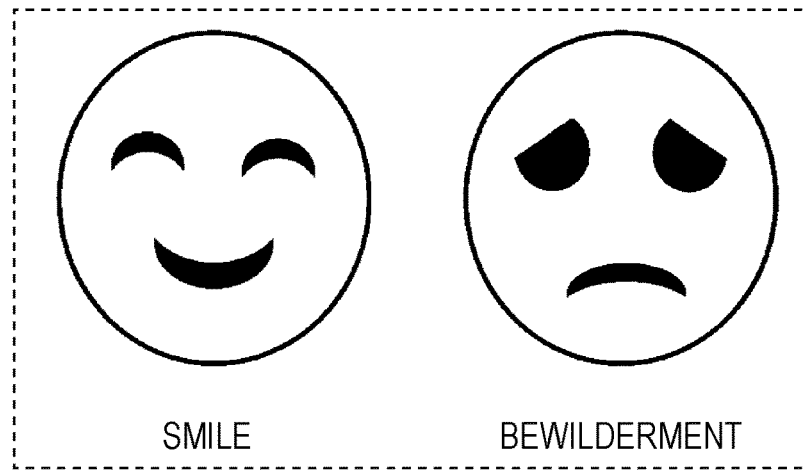
FIG. 14 is a diagram of display examples for prompting a child to stop an action for which the child is scolded.

FIG. 14 is a diagram of display examples for prompting a child to stop an action for which the child is scolded. In the examples of FIG. 14, two facial expressions are schematically depicted, representing human emotions by using the eyes and the mouth as an expression of smile and an expression of bewilderment sequentially from the left. In this case, the display control unit 17 stores in advance image data of at least one of images representing these expressions. Then, upon receiving a control command from the process determination unit 134A, the display control unit 17 causes image data of any one of the facial expressions defined in advance from among these facial expressions to be displayed on the display unit 19. For example, a facial expression of smile is intended to ask an action the child is currently performing, and a facial expression of bewilderment is intended to prompt the child to stop an action the child is currently performing. Here, the process determination unit 134A may cause an image representing a facial expression of smile to be displayed on the display unit 19 and, simultaneously, may cause a voice asking what the child is doing to be outputted from the sound output unit 15. Alternatively, the process determination unit 134A may cause an image representing a facial expression of bewilderment to be displayed on the display unit 19 and, simultaneously, may cause a speech prompting the child to stop the action the child is currently performing to be outputted from the sound output unit 15.

The process determination unit 134A may use two or more of the above processes (d) to (f) in combination.

Figure 8:
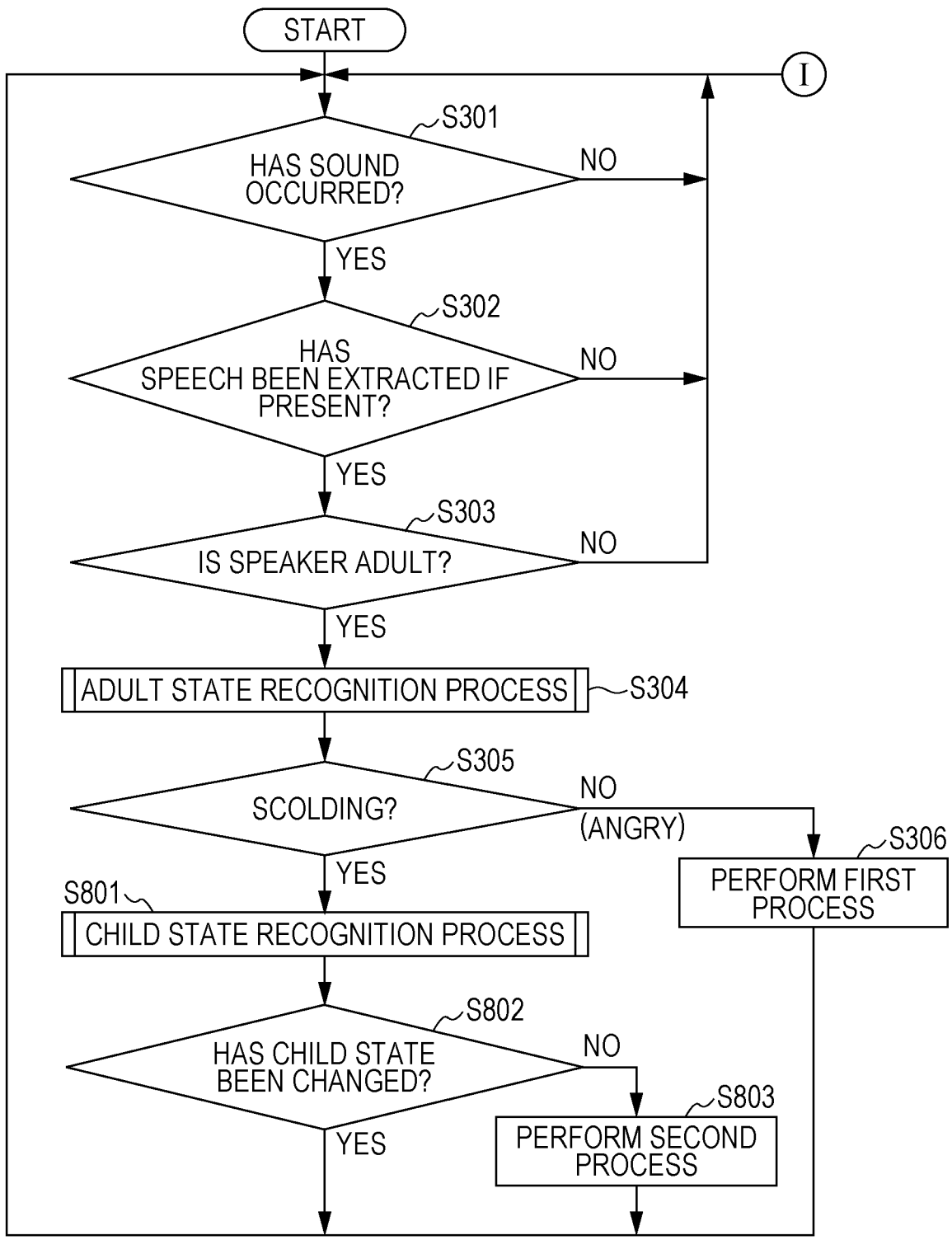
FIG. 8 is a flowchart of one example of a process by the apparatus in the second embodiment.
Figure 9:
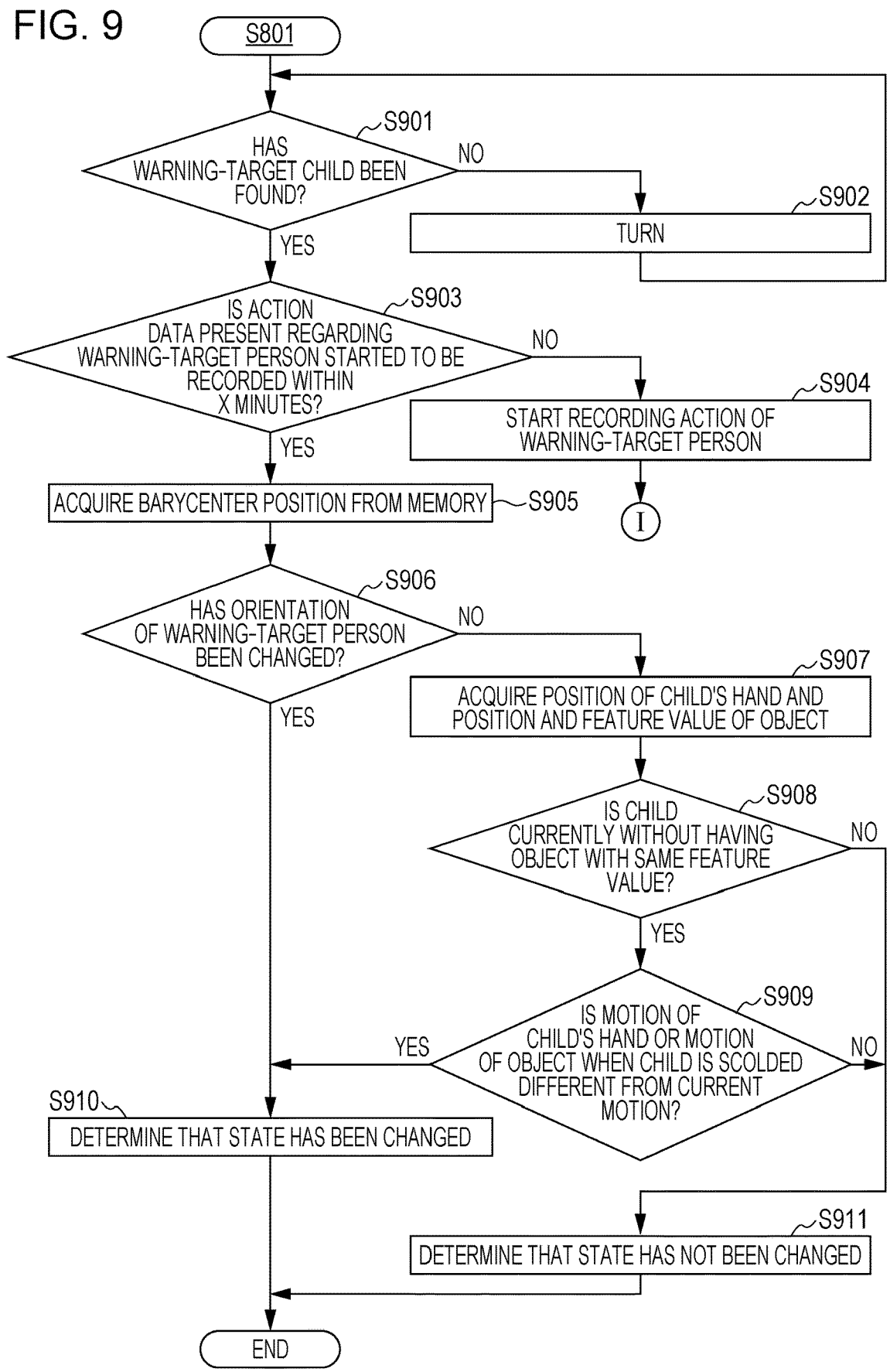
FIG. 9 is a flowchart of details of a child state recognition process depicted at S801 of FIG. 8.

FIG. 8 is a flowchart of one example of a process by the apparatus 1A in the second embodiment. FIG. 9 is a flowchart of details of a child state recognition process depicted at S801 of FIG. 8. By using FIG. 8 and FIG. 9, the process of the apparatus 1A of the second embodiment is described below.

In the following flowchart, the same process as that in the flowchart of the first embodiment depicted in FIG. 3 is provided with the same reference character and is not described herein.

In FIG. 8, when it is determined at S305 that the adult is angry (YES at S305), a child state recognition process is performed in the second embodiment (S801). Details of the child state recognition process will be described further below by using FIG. 9.

When it is determined as a result of the child state recognition process that the child state has been changed (YES at S802), the process is returned to S301, and the apparatus 1A becomes in a state of waiting for an input of an audio signal again. On the other hand, when it is determined that the child state has not been changed (NO at S802), the process determination unit 134A performs the second process to prompt the child to stop the action for which the child is scolded (S803). Specifically, one or plurality of processes from the above processes (d) to (f) is performed. After the process at S803 ends, the process is returned to S301.

Here, once it is determined by the adult state recognition process that the adult is scolding, the process determination unit 134A performs any one or plurality of the processes (d) to (f). This is merely an example. When scolding is detected a plurality of times or is consecutively detected a plurality of times within a predetermined period, the process determination unit 134A may perform any one or plurality of the processes (d) to (f). Alternatively, when scolding is detected a plurality of times within a predetermined period, the process determination unit 134A may change the process as the number of times increases. For example, the process determination unit 134A may perform any one of the processes (d) to (f) for scolding at the first time, may additionally perform another process other than the process performed at the first time from among the processes (d) to (f) for scolding at the second time, and may additionally perform another process other than the process performed at the second time for scolding at the third time.

Next, one example of the child state recognition process is described by using FIG. 9. First, the person estimation unit 501 finds a child as a warning-target person from the image data acquired by the video input unit 18 (S901). Here, the person estimation unit 501 extracts, from the image data acquired by the video input unit 18, a feature value of the face of a person included in the image data, compares the extracted feature value of the face with the feature value of the face of the child stored in advance in the memory 121 by using a related art scheme such as pattern matching and, if the image data includes the child, determines that the child as a warning-target person has been found from the image data.

When the person estimation unit 501 does not find the child as a warning-target person (NO at S901), the process determination unit 134A outputs, to the drive control unit 16, a control command for causing the apparatus 1A to be turned so that the video input unit 18 acquires image data at another angle (S902), and the process is then returned to S901. In this case, the process determination unit 134A outputs, to the drive control unit 16, a control command for increasing a turning amount of the apparatus 1A by a predetermined amount, thereby turning the apparatus 1A. With the processes at S901 and S902 being repeated, the child as the warning-target person can be found from the image data.

When finding a child as a warning-target person (YES at S901), the position information recording unit 502 refers to the memory 121 to determine whether action data is present regarding the warning-target person started to be recorded within X minutes (S903). Here, X minutes are assumed to be a period, if the warning-target person is scolded for a problematic action, from a time when the warning-target person stops that problematic action to a time the warning-target person takes another action and, for example, one minute, two minutes, three minutes, four minutes, five minutes, or the like.

If action data is not recorded on the memory 121 regarding the warning-target person started to be recorded within X minutes (NO at S903), the position information recording unit 502 causes the process to proceed to S904. At S904, the position information recording unit 502 starts recording action data regarding the warning-target person. The position information recording unit 502 determines NO at S903 when, for example, the warning-target person is scolded for the first time or a period from a time when recording of the action data regarding the warning-target person is started to a time when the warning-target person is scolded this time exceeds X minutes.

Specifically, at S904, the position information recording unit 502 records, on the memory 121, the barycenter position of the warning-target person, the position of at least one hand of the warning-target person, the position of an object held by hand at that time, and the feature value of this object as action data. After the process at S904 ends, the process is returned to S301 of FIG. 8.

On the other hand, at S903, if the action data is recorded on the memory 121 regarding the warning-target person started to be recorded within X minutes (YES at S903), the state change determination unit 503 acquires the barycenter position of the warning-target person from the memory 121 (S905).

Next, the state change determination unit 503 compares the barycenter position acquired from the memory 121 with a current barycenter position of the warning-target person to determine whether the orientation of the warning-target person has been changed (S906).

Here, the state change determination unit 503 determines that the orientation of the warning-target person has been changed when, for example, a distance between the barycenter position when time is started to be kept for X minutes and the current barycenter position of the warning-target person is equal to or longer than a reference distance.

Alternatively, the state change determination unit 503 may determine that the orientation of the warning-target person has been changed by detecting a motion pattern of the warning-target person from the change in the barycenter position recorded on the memory 121 in a period from a time when time is started to be kept for X minutes to date and analyzing the detected motion pattern.

In this flowchart, it is assumed that the warning-target person stops a problematic action and takes another action after a time when the warning-target person is scolded once until a time when a period of X minutes lapses. Thus, in this flowchart, when the warning-target person is scolded again after a time when the warning-target person is scolded at the first time until a time when a period of X minutes lapses, YES is determined at S903, and the process proceeds to a process of detecting a change of the orientation of the warning-target person at S905 onward. On the other hand, in this flowchart, when the warning-target person is scolded again after the lapse of X minutes, it is regarded that the warning-target person is performing a problematic action regarding another scolding different from scolding for the first time, NO is determined at S903 to start recording of action data regarding the other scolding, and the process then proceeds to S904.

When determining, from the change of the barycenter position, that the orientation of the warning-target person has been changed (YES at S906), the state change determination unit 503 determines that the state of the warning-target person has been changed, that is, the warning-target person has stopped the action for which the warning-target person is scolded (S910). This determination result indicates that scolding by the adult has stopped the action of the child for which the child is scolded.

On the other hand, when the state change determination unit 503 determines, from the change of the barycenter position, that the orientation of the warning-target person has not been changed (NO at S906), the process proceeds to S907.

The state change determination unit 503 acquires the position of the hand of the warning-target person, the position of the object, and the feature value of the object from the memory 121 (S907).

Next, the state change determination unit 503 determines whether the warning-target person is still holding the object with the same feature value as that of the object held when time is started to be kept for X minutes (S908). If the warning-target person is still holding the object with the same feature value as that of the object held when time is started to be kept for X minutes (NO at S908), the state change determination unit 503 determines that the state of the child as the warning-target person has not been changed (S911). This determination result indicates that the child is continuously performing the action for which the child is scolded even though the adult scolds the child.

On the other hand, when the state change determination unit 503 determines that the warning-target person does not hold an object with the same feature value of that of the object held at the start of keeping time for X minutes (YES at S908), the process proceeds to S909.

Next the state change determination unit 503 determines whether the motion of the hand of the warning-target person when the warning-target person is scolded is different from the current one or whether the motion of the object when the warning-target person is scolded is different from the current one (S909). Here, for example, in a period from a time when time is started to be kept for X minutes until now, the state change determination unit 503 analyzes a hand motion pattern and an object motion pattern from the position of the hand and the position of the object recorded on the memory 121 and, if a change has been observed in one of the motion patterns, determines YES at S909. With this, for example, whether the child is continuing a play such as ball hitting even if the child is scolded can be determined.

At least one of the motion of the hand of the warning-target person and the motion of the object when the warning-target person is scolded is different from a current one (YES at S909), the state change determination unit 503 determines that the state of the warning-target person has been changed (S910). On the other hand, both of the motion of the hand of the warning-target person and the motion of the object when the warning-target person is scolded are the same as current ones (NO at S909), the state change determination unit 503 determines that the state of the warning-target person has not been changed (S911).

As described above, in the second embodiment, when determining that the adult is scolding a child and the user included in the image data is a child, the state change determination unit 503 determines, based on the image data, whether the orientation of the child has been changed in a period of X minutes (one example of a second period) after the speech of the adult is recognized. When determining that the orientation of the child has not been changed, the state change determination unit 503 then determines, based on the image data, whether the child is continuously holding the object in the period of X minutes.

With this, whether the child is continuing the action for which the child is scolded can be determined.

Then, when it is determined that the orientation of the child has not been changed or that the child is continuously holding the object by hand, the process determination unit 134A performs one or plurality of the above processes (d) to (f). Thus, when the child is continuing the action for which the child is scolded, the child can be prompted to stop that action.

Of the flowcharts of FIG. 8 and FIG. 9, in the flowchart of FIG. 9 to be performed when the child is scolded again in the period of X minutes after once scolded, it is determined whether the state of the child has been changed. In other words, it is assumed in the flowcharts of FIG. 8 and FIG. 9 that the child has stopped the action for which the child is scolded unless scolded again in the period of X minutes.

However, this is merely an example. Even if the child is not scolded again in the period of X minutes after once scolded, the second process may be performed unless the orientation of the child has been changed or the child has released the object from the hand. In this case, the process is returned to S901 after the process at S904 of FIG. 9 ends.

Also, while YES is determined at S903 in the flowchart of FIG. 9 if recording is started before the time within X minutes, a mode may be adopted in which YES is determined after the end of recording for X minutes. In this case, even if the warning-target person is scolded during action data recording for X minutes, NO is determined at S903, and recording continues (S904). On the other hand, if the warning-target person is scolded after the lapse of X minutes, YES is determined at S903, and the process at S906 onward of determining whether the orientation of the warning-target person has been changed is performed. When this mode is adopted, even if the warning-target person is scolded again before the lapse of X minutes, the process at S906 onward is not performed, and thus the process steps can be reduced.

Third Embodiment

Figure 10:
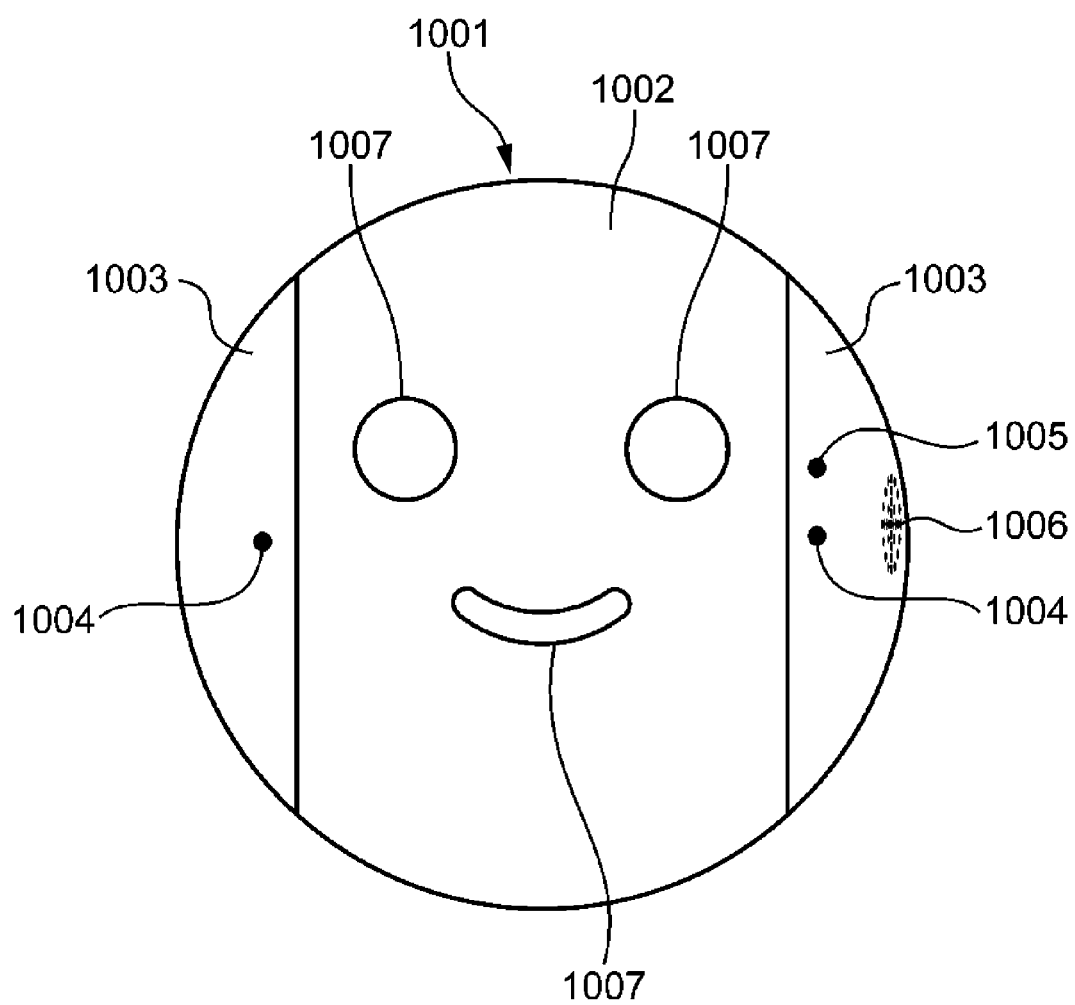
FIG. 10 is an external view of one example of a robot in a third embodiment.

FIG. 10 is an external view of one example of a robot 1001 in a third embodiment. In the third embodiment, the apparatus 1A according to the second embodiment is applied to the robot 1001. In the present embodiment, the same component as that of the first and second embodiments is provided with the same reference numeral and is not described herein.

The robot 1001 includes, as depicted in FIG. 10, a spherical-body-shaped main housing 1002, and paired spherical crown parts 1003 provided on both left and right sides of the main housing 1002. The main housing 1002 and the paired spherical crown parts 1003 configure a spherical body as a whole. That is, the robot 1001 has a spherical body shape. The right spherical crown part 1003 includes a camera 1004, a microphone 1005, and a loudspeaker 1006. The left spherical crown part 1003 includes a camera 1004. The main housing 1002 allows transmission of light applied from display units 1007 included inside (not depicted), thereby allowing a facial expression of the robot 1001 to appear. Also, although not depicted in FIG. 10, the robot 1001 includes a control circuit. The cameras 1004 serve as a stereo camera using two cameras, acquiring distance image data indicating video of the surrounding environment and a distance distribution. The control circuit controls various operations of the robot 1001. While the robot 1001 configures a spherical body as a whole in the present mode, this is not meant to be restrictive, and the robot 1001 may at least include a structure with a movement mechanism.

Figure 11:
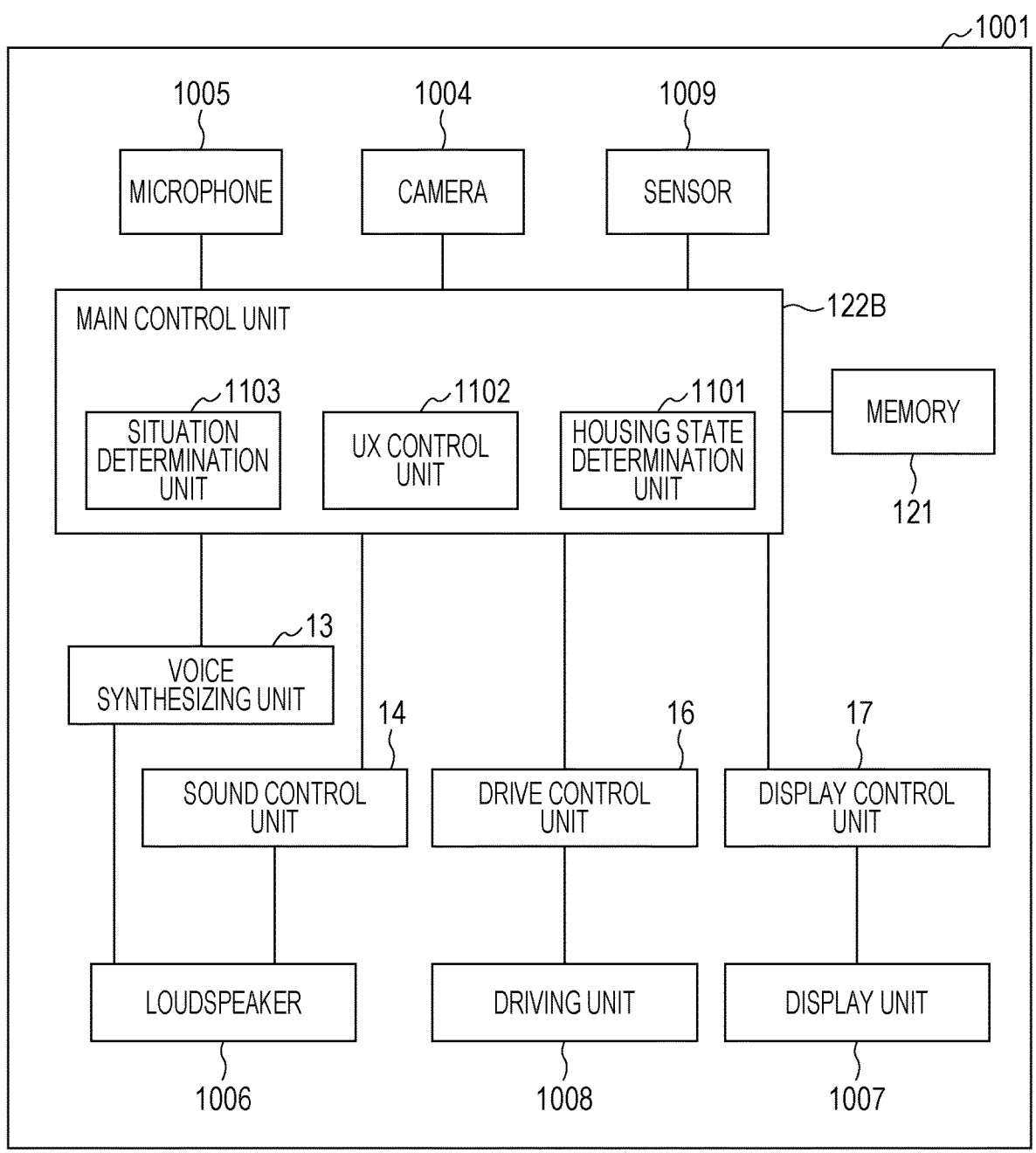
FIG. 11 is a diagram of one example of an electrical structure of the robot.

FIG. 11 is a diagram of one example of an electrical structure of the robot 1001. The robot 1001 includes the microphone 1005, the camera 1004, a sensor 1009, a main control unit 122B, the memory 121, the voice synthesizing unit 13, the sound control unit 14, the loudspeaker 1006, the drive control unit 16, a driving unit 1008, the display control unit 17, and the display units 1007.

The microphone 1005 corresponds to the voice input unit 11 of the first embodiment, outputting voice data to the speaker determination unit 131 (FIG. 1 and FIG. 5) of a situation determination unit 1103.

The camera 1004 corresponds to the video input unit 18 of the first and second embodiments, outputting image data and distance data to the person estimation unit 501 (FIG. 5) of the situation determination unit 1103.

The sensor 1009 includes various sensors included in the robot 1001 and, here, by way of example, includes an acceleration sensor. The acceleration sensor is configured of, for example, an acceleration sensor capable of measuring triaxial accelerations in an X axis corresponding to a lateral direction of the robot 1001, a Y axis corresponding to a front-and-back direction of the robot 1001, and a Z axis corresponding to a vertical direction of the robot 1001, and is installed inside the robot 1001.

The voice synthesizing unit 13 converts text data into voice data, as with the above embodiments. The sound control unit 14 retains and manages sounds and music data, as with the above embodiments, outputting a sound or music data to the loudspeaker 1006 in response to a control command transmitted from the main control unit 122B.

The loudspeaker 1006 corresponds to the sound output unit 15 of the above embodiments, outputting voice data.

The drive control unit 16 drives the driving unit 1008 in response to the control command transmitted from the main control unit 122B. When the transmitted control command is, for example, a user search command, the robot 1001 turns so as to look out over the surroundings.

The driving unit 1008 rotates the spherical-body-shaped main housing 1002 to allow the robot 1001 to move forward and backward. Also, the barycenter position inside the main housing 1002 is changed by a pendulum incorporated therein to allow a turning movement. In detail, the driving unit 1008 rotates the main housing 1002 with the barycenter position being shifted to left or right when viewed from the front of the robot 1001, thereby allowing the robot 1001 to turn. This driving mechanism is merely an example, and another driving process may be performed. For example, when the driving unit 1008 is configured of paired wheels for moving the robot 1001 forward or backward, the driving unit 1008 can turn the robot 1001 by making the rotation speed of one wheel varied from the rotation speed of the other wheel. Alternatively, when the driving unit 1008 includes a mechanism capable of steering the paired wheels, the driving unit 1008 can turn the robot 1001 by making the steering angle varied between the paired wheels.

The display control unit 17 causes a display on each display unit 1007 of the robot 1001 in response to the control command transmitted from the main control unit 122B. When the transmitted control command is, for example, a smile control command, the display control unit 17 instructs the display units 1007 at the position of the eyes and the display unit 1007 at the position of the mouth to display images of smiling eyes and mouth.

Each of the display units 1007 is a display device such as an LED panel or liquid-crystal panel included inside (not depicted) of the robot 1001. In the example of FIG. 10, the robot 1001 includes two display units 1007 corresponding to two eyes and one display unit 1007 corresponding to one mouth.

The main control unit 122B includes a housing state determination unit 1101, a UX control unit 1102, and the situation determination unit 1103.

The housing state determination unit 1101 determines, from the acceleration measured by the acceleration sensor of the sensor 1009, whether the housing is being carried by the user. The housing state determination unit 1101 acquires, from the drive control unit 16, information indicating whether the housing is currently in a driven state. Also, in the state in which the driving unit 1008 is not in a driven state, when determining that after a first value indicating an acceleration in the Z-axis direction outputted from the acceleration sensor exceeds a predetermined threshold, any of the first value, a second value indicating an acceleration in the Y-axis direction, and a third value indicating an acceleration in the X-axis direction fluctuates as exceeding a predetermined width for a predetermined period, the housing state determination unit 1101 determines that the robot 1001 is being carried by the user (held in the user's arms).

When determining whether the robot 1001 is being carried, the housing state determination unit 1101 may send a control command to stop driving to the drive control unit 16 and, after the driving is stopped, may perform the process of determining whether the robot 1001 is being carried. Also, to determine by whom the robot 1001 is being carried, the housing state determination unit 1101 may determine who is the user from a face recognition process by the camera 1004 or a voice of the user in response to a question to the user by saying "Hi" or the like. In this case, the housing state determination unit 1101 extracts a feature value of the face of the user from the image data acquired by the camera 1004 and compares the extracted feature value with the feature value of the face of the user recorded in advance on the memory 121 to determine the user carrying the robot 1001. Alternatively, the housing state determination unit 1101 extracts a voiceprint of the user from the audio signal acquired by the microphone 1005 and compares the extracted voiceprint with the voiceprint recorded in advance on the memory 121 to determine the user carrying the robot 1001.

The UX control unit 1102 manages a plurality of contents provided by the robot 1001. The contents define a drive pattern of the robot 1001, a display pattern to the display units 1007, an output pattern of a response sentence from the robot 1001, and so forth. Examples of the contents include a content which makes the robot 1001 dance while singing. For example, the UX control unit 1102 performs a drive control of replaying music and making the robot 1001 dance with the rhythm of the replayed music. Also, the UX control unit 1102 causes the facial expression displayed on the display units 1007 to be changed with the lyrics or rhythm of the replayed music and also causes the robot 1001 to make a speech for prompting the user to sing together.

The UX control unit 1102 manages the contents provided by the robot 1001 and retains information about the user playing together with the contents.

The situation determination unit 1103 corresponds to the situation determination device 12A in the above-described embodiment. In the present embodiment, the situation determination unit 1103 makes a situation determination in consideration of the state of the robot 1001 acquired by the housing state determination unit 1101 and the UX control unit 1102.

Figure 12:
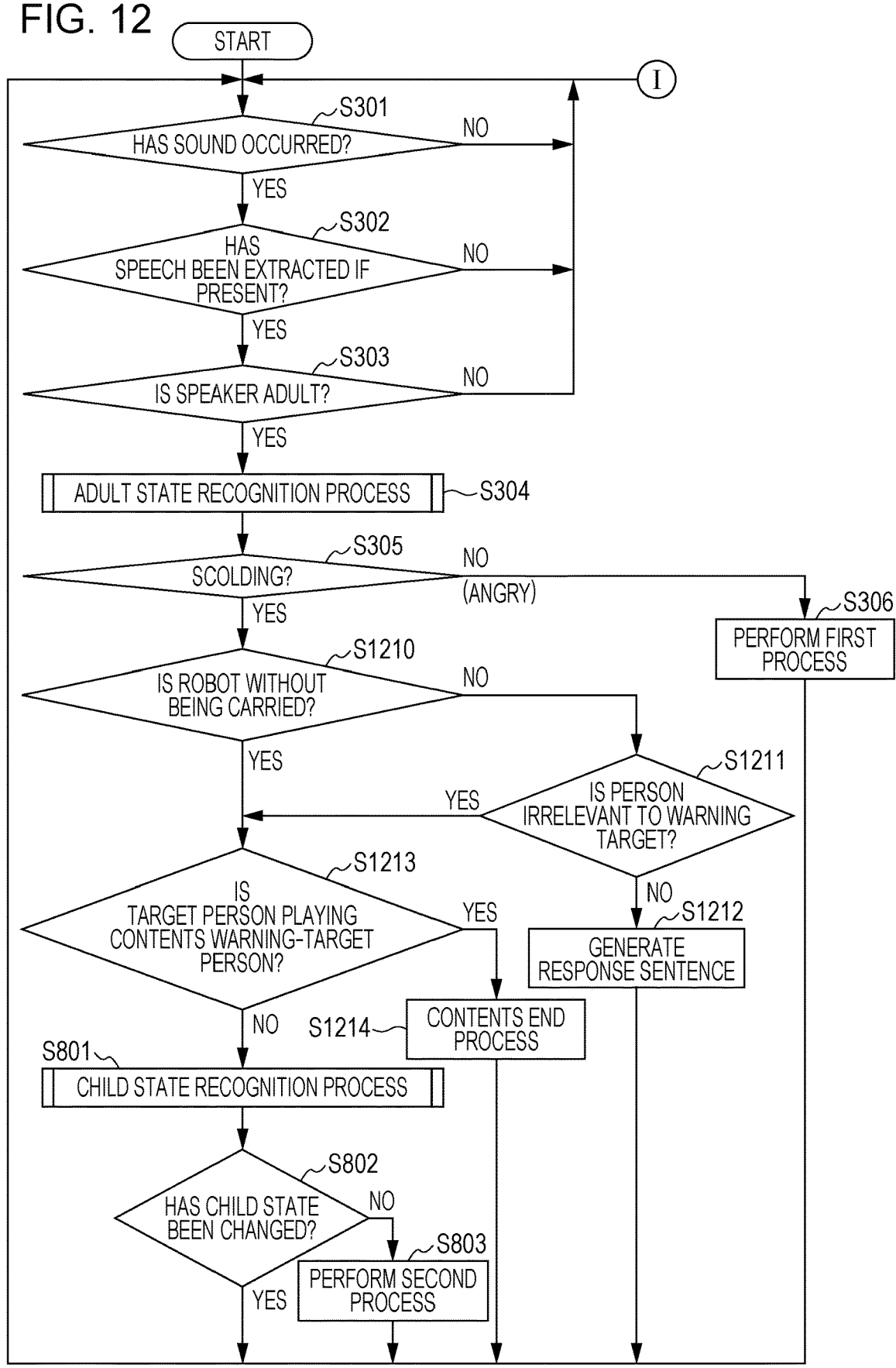
FIG. 12 is a flowchart of one example of a process by the robot in the third embodiment.

FIG. 12 is a flowchart of one example of a process by the robot 1001 in the third embodiment. In the following, a method is described by using FIG. 12 in which whether the adult as a child caregiver is scolding the child or angry is determined and, at that time, a determination is made as to the state of the robot 1001 and whether the warning-target person is warned for playing the robot 1001.

In the following description, the same process as that of the above embodiments is provided with the same reference character for simplification of description.

When the adult state recognition process determines that the adult as a child caregiver is scolding (YES at S305), the housing state determination unit 1101 determines whether the robot 1001 is currently being carried by using the acceleration acquired by the sensor 1009 (S1210).

When determining that the robot 1001 is not currently without being carried (NO at S1210), the housing state determination unit 1101 determines whether the carrying user is irrelevant to a warning-target person who is being warned (S1211). In this case, the housing state determination unit 1101 extracts a feature value of the face of the user carrying the robot 1001 from the image data acquired by the video input unit 18 and, if the extracted feature value of the face matches the feature value of the face of the warning-target person, determines that the user carrying the robot 1001 is the warning-target person. Alternatively, the housing state determination unit 1101 causes the microphone 1005 to acquire a voice from the user carrying the robot 1001 and, if the voiceprint of the voice matches the voiceprint of the warning-target person, determines that the user carrying the robot 1001 is the warning-target person. Here, the feature value of the face and the voiceprint of the warning-target person recorded in advance on the memory 121 can be used.

On the other hand, when the housing state determination unit 1101 determines that the user carrying the robot 1001 is not irrelevant to the warning-target person (NO at S1211), the process determination unit 134A of the situation determination unit 1103 generates text data of a response sentence of which the warning-target person is notified (S1212). The generated text data of the response sentence is converted by the voice synthesizing unit 13 into voice and is outputted from the loudspeaker 1006. Here, as the response sentence to the warning-target person, a response sentence for prompting the warning-target person carrying the robot 1001 to release the robot 1001 can be adopted. By way of example, a response sentence, "Why don't you put me down?", can be adopted. With this, when the warning-target person scolded for playing by carrying the robot 1001 does not stop playing, the warning-target person can be prompted to stop playing. When YES is determined at S1211, the process proceeds to S1213.

On the other hand, when the housing state determination unit 1101 determines that the robot 1001 is currently without being carried (YES at S1210), the process determination unit 134A of the situation determination unit 1103 acquires, from the UX control unit 1102, information about the user playing the contents being currently executed and, from the acquired user information, determines whether the user playing the contents being currently executed is a warning-target person (S1213).

When the user playing the contents being currently executed is a warning-target person (YES at S1213), the process determination unit 134A of the situation determination unit 1103 causes the UX control unit 1102 to perform a process of ending the contents (S1214). This can prompt the warning-target person not carrying the robot 1001 but scolded for playing with the robot 1001 to stop playing with the robot 1001.

On the other hand, when the user playing the contents is not a warning-target person (NO at S1213), a child state recognition process is performed (S801). In the example of FIG. 12, when the user playing the contents being currently executed is a warning-target person (YES at S1213), the process of ending the contents is performed (S1214), but this is merely an example. The process determination unit 134A may instruct the UX control unit 1102 to execute other contents different from the contents being currently executed. Here, the UX control unit 1102 confirms to the scolding adult whether to admit execution of other contents and, if an admission is received from the adult, the other contents are executed.

FIRST MODIFICATION EXAMPLE

In the present disclosure, a mode may be adopted in which a user who warns a child or a user who is warned is set in advance. In this mode, when it is detected that the user set in advance is warning, whether the user is scolding or angry is determined and, if angry, the first process is performed. Also in this mode, when it is detected that the user set in advance is scolded, the second process is performed.

According to this mode, for example, when the adult as the user set in advance warns the child while visitors are present, a process of specifying the warning adult is easily performed. Also, for example, when a plurality of children are present, a process of determining a warned child is easily performed.

SECOND MODIFICATION EXAMPLE

In the above-described embodiments, the mode is adopted in which the first process is performed for the adult when it is determined that the adult is angry. However, the present disclosure is not limited to this. For example, an image of the face of the angry adult may be taken and stored in the memory (hereinafter referred to as a process (g)), and the facial expression of angry may be viewed later by the angry adult by using an external terminal such as a smartphone. According to this mode, the adult can objectively check the facial expression when the adult himself or herself is angry at the child, which is usually unviewable.

THIRD MODIFICATION EXAMPLE

In the above-described embodiments, a mode may be adopted in which, when it is determined that the adult is angry or scolding, the date and time at each determination, the warning person, the warned person, the determination result as to whether the warning person is angry or scolding, and so forth are recorded on the memory. In this case, the information recorded on the memory can be utilized as child's growth records.

FOURTH MODIFICATION EXAMPLE

In FIG. 1 and FIG. 5, the apparatus 1 includes the sound output unit 15, the display unit 19, and the video input unit 18. However, the apparatus 1 may include at least one of these units.

In the first and second embodiments, the apparatus 1 performs at least one of the processes (b) and (a) if including the sound output unit 15, performs at least one of the processes (b) and (c) if including the display unit 19, and performs at least one of the processes (b) and (g) if including the video input unit 18.

Also in the second embodiment, the apparatus 1 performs at least one of the processes (e) and (d) if including the sound output unit 15, and performs at least one of the processes (e) and (f) if including the display unit 19.

According to the present disclosure, when the adult is angry at the child, the adult can be made aware as such. Thus, the present disclosure can be used in the technical field regarding educational robots.

What is claimed is:

1. An apparatus for processing a voice, the apparatus comprising:
   a microphone which acquires a sound around the apparatus;
   a processor and a memory that stores a set of executable instructions, wherein when the processor executes the instructions, the apparatus operates as:
   an extractor which extracts a voice from the acquired sound and determines whether the voice includes a speech of an adult;
   a voice recognizer which recognizes the speech of the adult when it is determined that the voice includes the speech of the adult and determines whether the speech of the adult includes a phrase included in a dictionary stored in the memory, wherein the voice recognizer further determines whether the speech of the adult includes a phrase corresponding to a name of a child, based on data indicating the name of the child stored in the memory,
   a speech analyzer configured to determine, after the voice recognizer determines that the speech of the adult includes the phrase included in the dictionary, whether the adult is angry and whether the adult is scolding, based on a physical feature value of the speech of the adult, wherein when it is determined that the speech of the adult includes a phrase corresponding to the name of the child, the speech analyzer further determines that the child is a target person at whom the adult is scolding or angry, a controller which causes the apparatus to perform a first process to alert the adult of the adult being angry when it is determined that the adult is angry, a loudspeaker, wherein the first process includes either of (i) a process of causing the loudspeaker to output a first sound and (ii) a process of causing the apparatus to perform a first operation, a display, wherein the first process further includes either of (i) a process of causing the display to perform a first display and (ii) the process of causing the apparatus to perform the first operation, and a camera which acquires video data around the apparatus, wherein the first process further includes either of (i) a process of causing the camera to take an image of the adult and (ii) the process of causing the apparatus to perform the first operation, wherein when the processor executes the instructions, the apparatus is further configured to operate as:

a comparator which determines whether a person included in the video data is the child, based on video data corresponding to the child stored in the memory, and a video analyzer which determines, based on the video data, whether an orientation of the child has been changed in a second period after the speech of the adult is recognized when it is determined that the adult is scolding the child and the person included in the video data is the child and determines, based on the video data, whether the child is continuously holding an object by hand in the second period when it is determined that the orientation of the child has not been changed, wherein:

in the second period, when it is determined that the orientation of the child has not been changed or when it is determined that the child is continuously holding the object by hand, the controller causes the apparatus to perform a second process, and the second process includes any of (i) a process of causing the loudspeaker to output a second sound, (ii) a process of causing the apparatus to perform a second operation, (iii) a process of causing the apparatus to perform the second operation and (iv) a process of causing the display to perform a second display.

2. The apparatus according to claim 1, wherein the second sound includes a predetermined alarm sound.

3. The apparatus according to claim 1, wherein the second sound includes predetermined music.

4. The apparatus according to claim 1, wherein the second sound includes a voice prompting the child to stop an action the child is currently doing.

5. The apparatus according to claim 1, wherein the second sound includes a voice asking the child what the child is doing now.

6. The apparatus according to claim 1, wherein the second operation includes an operation of causing the display to be oriented toward the child.

7. The apparatus according to claim 1, wherein the second operation is an operation of causing the apparatus to be oriented toward the child.

8. The apparatus according to claim 1, wherein the second display includes a display symbolically representing eyes and a mouth on the apparatus, and the display corresponds to a predetermined facial expression on the apparatus.

* * * * *